US006961646B2

(12) United States Patent
Soliman et al.

(10) Patent No.: US 6,961,646 B2
(45) Date of Patent: Nov. 1, 2005

(54) AUTOMATIC TRANSMISSION CONTROL SYSTEM WITH DIRECT ELECTRONIC SWAP-SHIFT CONTROL

(75) Inventors: Ihab Soliman, Dearborn, MI (US); Brian Keyse, Farmington Hills, MI (US); Bradley Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 10/699,383

(22) Filed: Oct. 31, 2003

(65) Prior Publication Data

US 2005/0096820 A1 May 5, 2005

(51) Int. Cl.[7] ........................ G06F 17/00; F16H 31/00; B60K 41/12

(52) U.S. Cl. ............................ 701/51; 701/60; 701/66; 701/67; 477/41; 477/69; 475/127; 475/330; 475/903; 475/128

(58) Field of Search ............................ 701/51, 60, 64, 701/66, 67; 475/36, 53, 125, 127, 330, 903, 62, 63, 70, 128, 43, 276; 477/41, 69

(56) References Cited

U.S. PATENT DOCUMENTS

| | | | | |
|---|---|---|---|---|
| 4,611,285 A | | 9/1986 | Weisman, II | |
| 5,157,608 A | | 10/1992 | Sankpal et al. | |
| 5,553,694 A | | 9/1996 | Schulz et al. | |
| 5,586,029 A | | 12/1996 | Schulz et al. | |
| 5,612,874 A | | 3/1997 | Schulz et al. | |
| 5,642,283 A | * | 6/1997 | Schulz et al. | 701/51 |
| 5,646,842 A | | 7/1997 | Schulz et al. | |
| 5,722,519 A | | 3/1998 | Kirchhoffer | |
| 5,758,302 A | | 5/1998 | Schulz et al. | |
| 5,809,442 A | * | 9/1998 | Schulz et al. | 701/51 |
| 5,835,875 A | | 11/1998 | Kirchhoffer | |
| 6,101,440 A | * | 8/2000 | Wagner et al. | 701/67 |
| 6,122,583 A | * | 9/2000 | Kirchhoffer et al. | 701/51 |
| 6,253,140 B1 | | 6/2001 | Jain et al. | |
| 6,278,926 B1 | | 8/2001 | Jain et al. | |
| 6,292,731 B1 | * | 9/2001 | Kirchhoffer et al. | 701/55 |
| 6,299,565 B1 | | 10/2001 | Jain et al. | |
| 6,301,538 B1 | | 10/2001 | Kirchhoffer | |
| 6,370,463 B1 | * | 4/2002 | Fujii et al. | 701/51 |
| 6,385,520 B1 | * | 5/2002 | Jain et al. | 701/51 |
| 6,577,939 B1 | | 6/2003 | Keyse et al. | |
| 6,780,131 B2 | * | 8/2004 | Hiramatsu et al. | 475/127 |
| 2002/0086761 A1 | * | 7/2002 | Hayabuchi et al. | 475/127 |
| 2002/0151400 A1 | * | 10/2002 | Bai et al. | 475/128 |
| 2002/0156563 A1 | * | 10/2002 | Sato et al. | 701/60 |
| 2004/0043857 A1 | * | 3/2004 | Nishida et al. | 475/125 |

* cited by examiner

*Primary Examiner*—Thomas G. Black
*Assistant Examiner*—Brian J. Broadhead
(74) *Attorney, Agent, or Firm*—David B. Kelley; Brooks & Kushman

(57) ABSTRACT

A control system and control method for an automotive vehicle having a multiple-ratio automatic transmission having two gearsets arranged in series relationship for delivering vehicle engine power to vehicle traction wheels, each gearset being controlled using friction elements that establish multiple torque flow paths, each gearset being characterized by at least two ratios, which define an overall transmission ratio, synchronous shifting of the gearsets effecting at least one swap-upshift and at least one swap-downshift in the overall transmission ratio, the control system compensating during a swap-shift progression for dynamic interaction between the gearsets.

40 Claims, 13 Drawing Sheets

| GEAR | 1 | 2 | 3 | 4 | 5 | 6 |
|---|---|---|---|---|---|---|
| 2-SPEED OD SET | LOW 1 | HIGH 0.712 | LOW 1 | HIGH 0.712 | LOW 1 | HIGH 0.712 |
| 3-SPEED SIMPSON GEAR SET | 1st 3.090 | 1st 3.091 | 2nd 1.538 | 2nd 1.539 | 3rd 1.000 | 3rd 1.000 |
| TOTAL GEAR RATIO | 3.09 | 2.201 | 1.538 | 1.096 | 1 | 0.712 |

AUTOMATIC TRANSMISSION CONTROL SYSTEM WITH DIRECT ELECTRONIC SWAP-SHIFT CONTROL

BACKGROUND OF THE INVENTION

1. Field of the Invention

The invention relates to a multiple-ratio geared transmission for an automotive vehicle with two gearsets arranged in series wherein ratio changes in the transmission are characterized by swap-shifts.

2. Background Art

A multiple-ratio power transmission mechanism with five forward driving ratios and a single reverse driving ratio is disclosed in U.S. Pat. No. 5,809,442, which is assigned to the assignee of the present invention. It includes a compound planetary gearset with three forward driving ratios, the gearing elements being arranged in a configuration that commonly is referred to as a compound planetary Simpson gearset. A second overdrive gearset is arranged in series with respect to the Simpson gearset and typically is located between the Simpson gearset and a hydrokinetic torque converter, which has an impeller driven by an internal combustion engine and a turbine connected drivably to a planetary carrier for the overdrive gearset. A ring gear of the overdrive gearset acts as a torque input element for the Simpson gearset.

The overdrive gearset is a simple planetary gearset, which establishes an overdrive ratio and a direct-drive ratio. It includes a friction brake for the reaction element and an overrunning coupling to establish torque flow between two elements of the overdrive gearset as the overdrive gearset is upshifted.

The Simpson gearset establishes three forward driving ratios. It includes a second overrunning coupling, which establishes a non-synchronous ratio shift. Forward drive is achieved by engaging a forward clutch during a shift from neutral to drive. A separate reverse engagement clutch is used to establish a torque flow path for reverse. Ratio changes are controlled by an electronic microprocessor, which develops signals in response to operating variables for the driveline of the vehicle to actuate and release shift solenoid valves, which in turn control shift valves.

On an upshift from the second ratio to the third ratio, reaction torque on one gear component is relieved as reaction torque for a companion gear component is applied. A 2-3 upshift involves a downshift of the overdrive gear unit while the Simpson gearset is upshifted. Both of these shifts are synchronized without losing capacity of the affected gear elements during the shift interval. This shift is referred to as a so-called "swap-shift." In a similar fashion, a ratio change from the third ratio to the second ratio involves an upshift of the overdrive gear unit, while the Simpson gearset is downshifted.

U.S. Pat. No. 6,370,463 discloses a control system for controlling the timing of the application and release of the clutches and brakes during a swap-shift. The release of the reaction brake for the overdrive gearset and the application on the reaction brake for the Simpson gearset during an overall 2-3 upshift must be accomplished synchronously. An error in the synchronization would deteriorate the shift quality, which would be perceived by the vehicle operator as a shift shock due to inertia torque disturbances.

The control system reduces the capacity of the reaction brake for the overdrive gearset as the reaction brake for the Simpson gearset is increased. Early release of the friction brake for the overdrive gearset would cause a sudden increase in the torque transfer from the overdrive brake to the overrunning coupling, while the reaction brake for the Simpson gearset is still rotating. In a transmission of this kind, a torque transfer from the overdrive brake to the overrunning coupling of the overdrive gearset and an increase in the brake torque capacity for the Simpson gearset results in a large output torque spike if the brake application and release sequence is not precisely timed.

SUMMARY OF THE INVENTION

The invention comprises a swap-shift control for an electronic shift control transmission. The invention is applicable to a swap-shifting transmission of the type described in the prior art patents previously discussed wherein the overall ratio change during a swap-shift is achieved by simultaneously upshifting the overdrive gearset while downshifting the Simpson gearset, or vice versa. Since the Simpson gearset has three ratios in the forward driving mode and a single reverse ratio in the reverse driving mode, and since the overdrive gear unit has two ratios, it theoretically is possible to achieve eight (6 forward, 2 reverse) or six forward overall torque ratios for a swap-shift transmission of the present invention. But since the ratio change between the fourth ratio and the fifth ratio in a six-speed ratio embodiment of the invention is relatively slight, the fourth ratio usually can be eliminated so that a ratio change from the third ratio to the next higher ratio would use the fifth ratio as the destination gear on an upshift.

As in the case of the prior art designs discussed above in the preceding section, it is possible to achieve an overall ratio change from the second ratio to the third ratio, as well as from the second ratio to the fifth ratio. Conversely, an overall ratio change can be achieved from the fifth ratio to the second ratio as well as from the third ratio to the second ratio. Each of these upshifts and downshifts is characterized as a swap-shift.

The control system of the present invention overcomes the technical problem of achieving precise synchronization of the upshift and the downshift of the Simpson gearset and the overdrive gearset. It is capable of achieving acceptable swap-shift quality by establishing precise synchronization consistently throughout the life of the transmission withstanding vehicle component and vehicle environmental variations. This precise synchronization is accomplished with the invention presently disclosed by sensing the shift progression of both the overdrive gearset and the Simpson gearset during swap-shift events. The control system of the invention independently monitors the shift progressions of both gearsets and compensates for dynamic interaction between the overdrive gearset and the Simpson gearset during swap-shifts. Independent precision control of the friction elements (i.e., the pressure-actuated clutches and brakes) is obtained.

According to another feature of the invention, the control system achieves improved shift quality by accommodating power mode transitions during a swap-shift as powertrain torque direction is changed. Furthermore, improved responsiveness to control commands may be obtained by pre-staging the application and release of friction elements in the transmission. This technique is related to the pre-staging of the ratio changes during a swap-shift sequence, as described in the U.S. Pat. No. 6,557,939, which is assigned to the assignee of the present invention.

As previously indicated, the improved control system of the invention makes it possible to provide an adaptive technique for maintaining precision control of the friction elements as vehicle component environmental changes occur throughout the life of the transmission.

The controller of the present invention avoids a condition in which one gear unit, such as the overdrive gearset, begins a ratio change while the Simpson gearset has not begun its ratio change. It also avoids the condition in which either of the friction elements of the two gearsets would be prematurely forced to enter closed-loop control without the gearset having started its ratio change. A timing error is avoided as the controller initiates a swap-shift. This is unlike earlier swap-shift controls of the type previously described wherein a single state control for the operating modes of the overdrive gearset and the Simpson gearset is used.

The present invention, rather than using two independent feedback control systems for the overdrive gearset and the Simpson gearset (which would lack dual dynamic interaction compensation during swap-shifting), uses fully interactive feedback control for the two gearsets. Further, the present invention compensates for both the input and intermediate shaft accelerations that occur during swap-shifts, thereby ensuring that there is a sufficient starting pressure to initiate a ratio change in each of the gearsets. A supplementary torque due to rotary inertia is calculated as a function of the various internal inertias. These internal inertias are accounted for in calculating the starting pressures for the friction elements at the start of a shift.

Further, the present invention provides sufficient real-time correction to the desired command for the overdrive gearset friction element to compensate for changes in the Simpson gearset shift progression and shift progression rate.

The present invention further detects shift completion of each gearset independently. It also independently detects ratio change starts for both gearsets.

The swap-shift pressure control system of the invention is a master-slave type control system in which the Simpson gearset friction element is the master and the overdrive gearset friction element is the slave. In general, the Simpson gearset friction element controls the overall ratio range, whereas the overdrive gearset element tracks the shift progression of the Simpson gearset in all modes of control, thereby achieving optimum synchronization.

The independent ratio change detection of both the overdrive gearset and the Simpson gearset uses three speed sensors; i.e., a turbine speed sensor, an intermediate shaft speed sensor, and an output shaft speed sensor. This makes it possible to calculate and detect an independent start of each ratio change as well as an independent end of each ratio change.

The Simpson gearset friction element can enter closed-loop control independently of the overdrive gearset friction element. This prevents premature closed-loop control of the non-slipping friction element and takes full advantage of independent ratio change sensing of both gearsets.

The controller of the present invention makes it possible for the overdrive gearset friction element involved in a shift to hold its pressure to prevent an early ratio change start relative to that of the Simpson gearset. It furthermore provides an ability to independently control the length of time in closed-loop control, or in any other mode of control, for each friction element. Independent state control of the friction elements for each gearset provides accurate information for an adaptive algorithm for time and the particular modes or phases of control, thus improving "learning opportunities." This would apply for both the torque transfer phase of a ratio change and the inertia phase of a ratio change. The torque transfer phase occurs as pressure of an oncoming friction element is increased to develop torque capacity and the inertia phase occurs as the angular velocity of the torque delivery elements of the gear system change from one level to the other during shift progression.

The controller of the invention calculates separate starting torques for both the overdrive gearset element and the Simpson gearset element. At the initiation of a swap-shift, the separate starting torques are modified to compensate for the various internal inertias which are affected by the input and intermediate shaft accelerations, which occur during a swap-shift.

The controller of the invention has dual dynamic interaction compensation while applying a closed-loop control for both the friction element of the overdrive gearset and the friction element for the Simpson gearset. Since the overdrive and Simpson gearsets dynamically interact during their simultaneous ratio change, a pressure change in the control of each friction element is seen as a disturbance during control of the other friction element. In this respect, the two controllers for the overdrive gearset and the Simpson gearset are not fully independent since compensation is provided to account for the dynamic interaction. Furthermore, the overdrive controller will apply a real-time correction to the desired controller command for the overdrive gearset friction element to compensate for varying rates of shift progression of the Simpson gearset.

DETAILED DESCRIPTION OF AN EMBODIMENT OF THE INVENTION

Figure 1A:
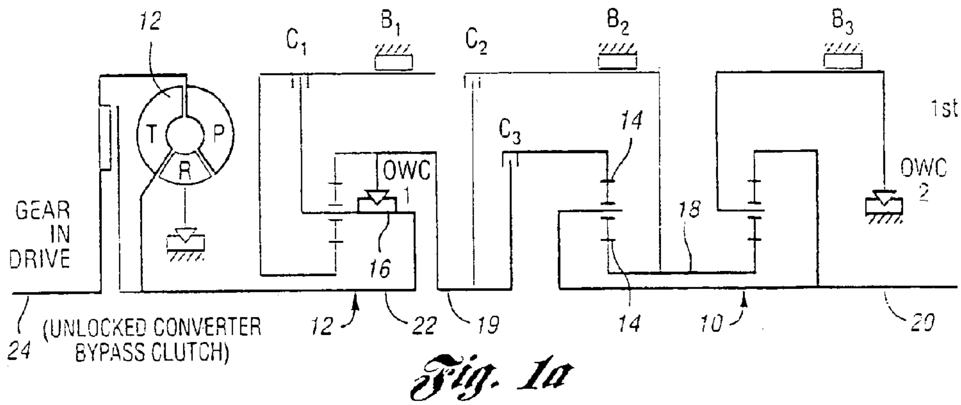
FIGS. 1a–1e are schematic diagrams of the gearing for a swap-shift transmission that may embody the improvements of the invention, FIG. 1a indicating first gear, FIG. 1b indicating second gear, FIG. 1c indicating third gear, FIG. 1d indicating fourth gear and FIG. 1e indicating fifth gear.

In FIGS. 1*a*–1*e*, several operating modes for a first embodiment of a transmission gearing arrangement are illustrated schematically. The transmission includes a so-called Simpson gearset, shown generally at 10, and a simple planetary gearset, shown generally at 12. A torque input ring gear 14 for the Simpson gearset receives torque from a forward drive clutch C3, which is engaged during each of five forward driving ratios. Overrunning coupling 16 between the carrier and ring gear of gearset 12 is engaged during operation in the first, third and fifth ratios when sun gear brake B1 is released. The sun gear shaft 18 for the Simpson gearset is adapted to be braked during third speed ratio operation by brake band B2.

A coast clutch C1 drivably connects the carrier with the sun gear of gear unit 12, thereby locking the elements of the gear unit 12 together so that it can accommodate reverse torque delivery during engine braking. Forward clutch C3 connects intermediate shaft 19 to the ring gear 14 of the first planetary gear unit of gearset 10. A second ring gear of the second planetary gear unit of gearset 10 is connected drivably to output shaft 20, as is the carrier for the planetary pinions of the second planetary gear unit. The sun gears are connected to a common sun gear shaft 18. The carrier for the second gear unit of gearset 10 is connected to a brake drum, which is anchored selectively by brake B3. Brake B3 is engaged during reverse drive. During forward drive in the first ratio in the automatic operating mode, the carrier for the second gear unit of gearset 10 is braked-by overrunning coupling OWC2.

Figure 1B:
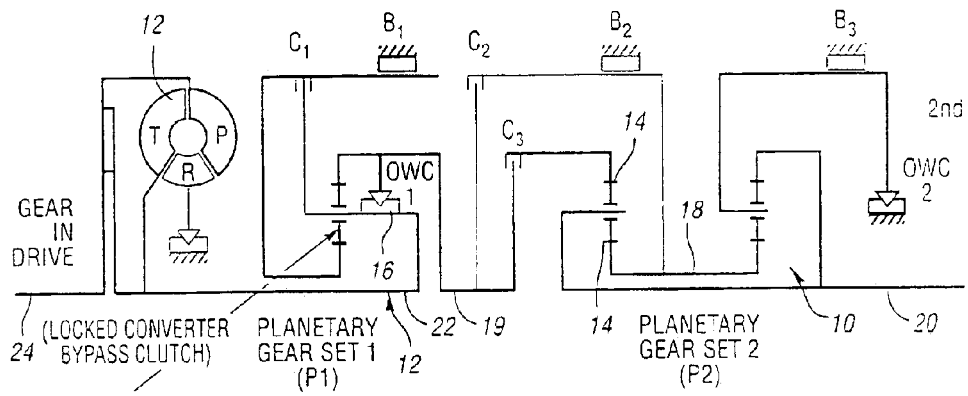
Figure 1C:
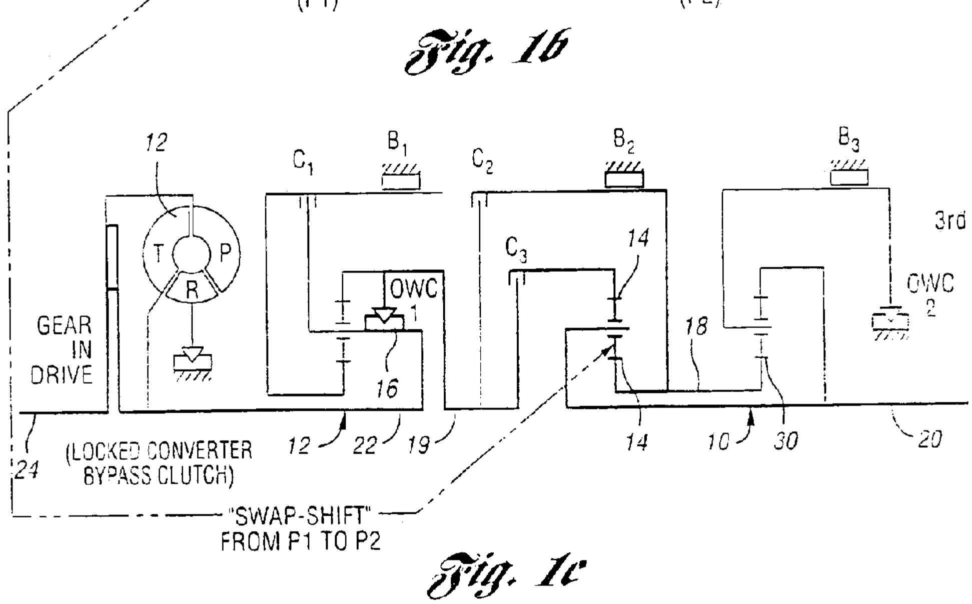
Figure 1D:
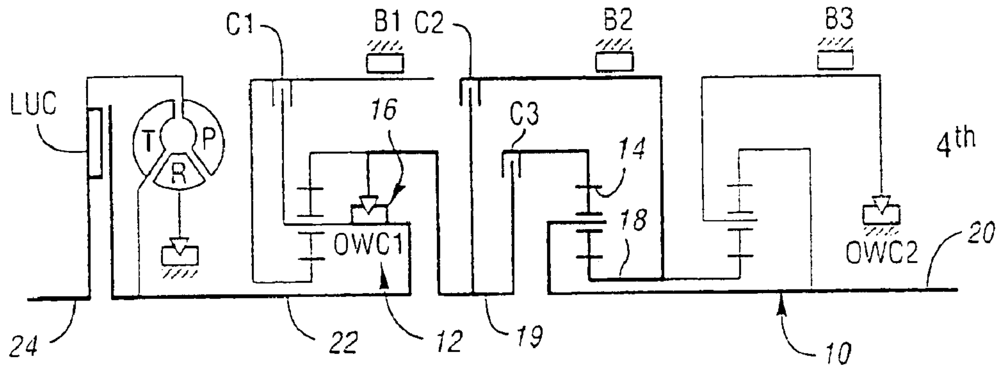
Figure 1E:
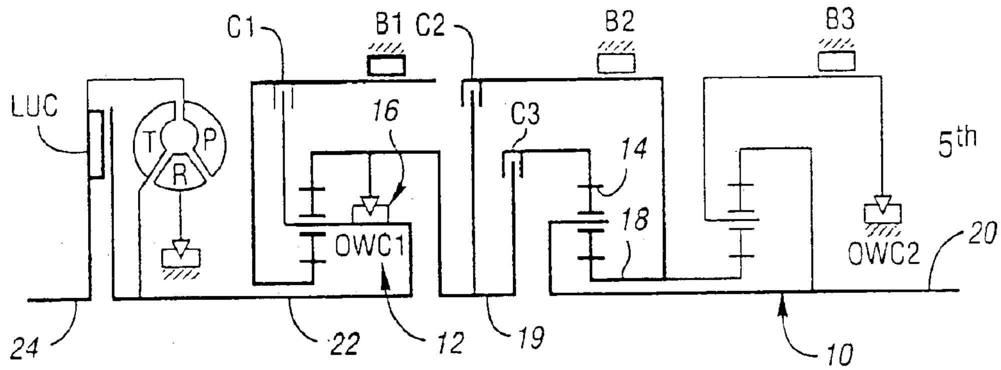
Figure 1F:
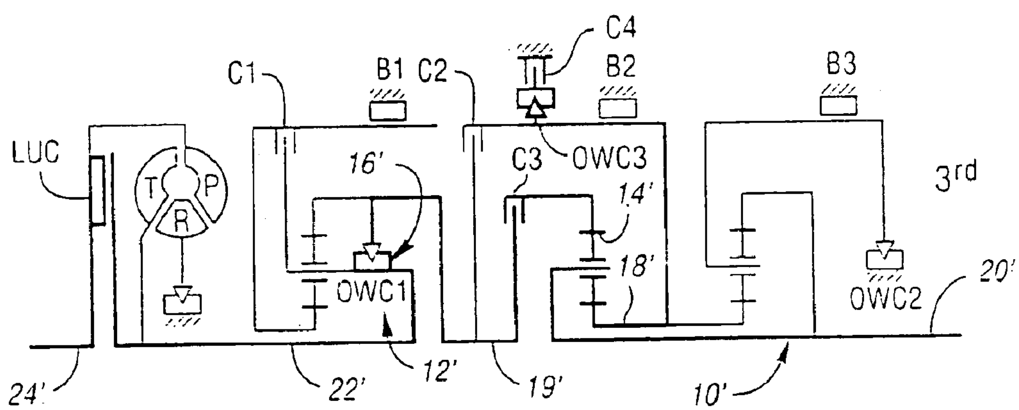
FIGS. 1f–1h are schematic diagrams of the gearing arrangement for a swap-shift transmission of the kind illustrated in FIGS. 1a–1e, although the brake drum for the common sun gear of the Simpson gearset has an overrunning coupling in series with a friction brake for accommodating non-synchronous ratio changes, FIGS. 1f–1h corresponding respectively to FIGS. 1c–1e, respectively, for third gear, fourth gear and fifth gear.
Figure 1G:
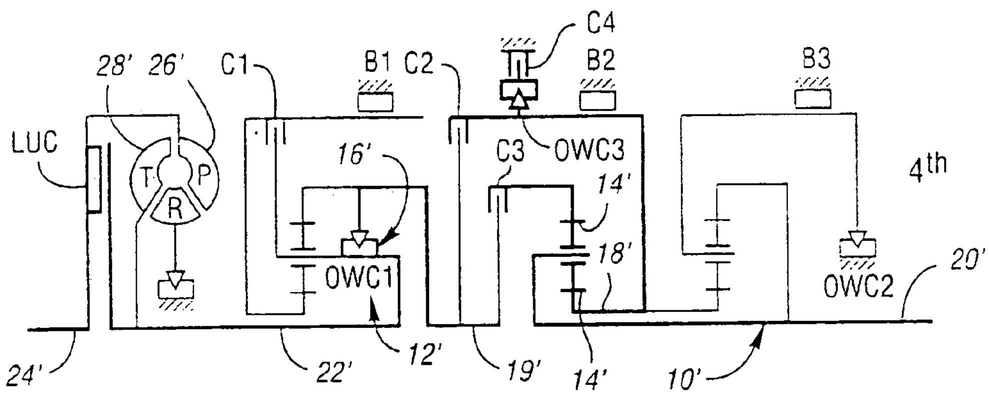
Figure 1H:
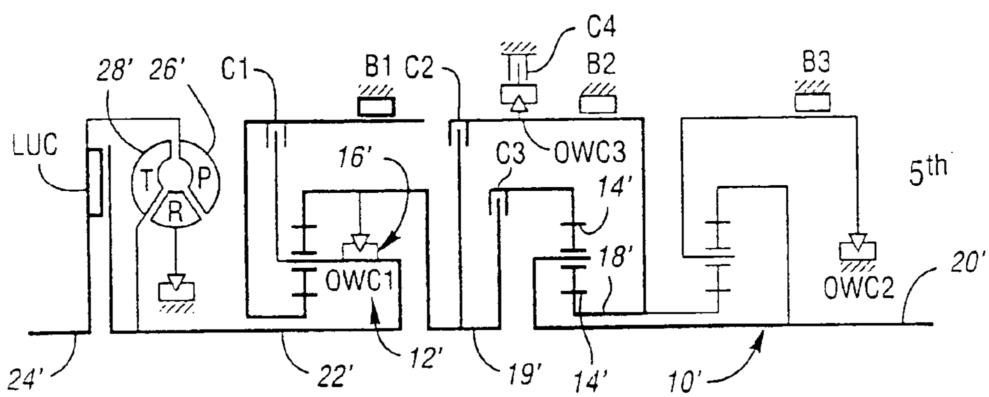

The elements of the transmission of FIGS. 1*f*–1*h* that have a counterpart in the transmission of FIGS. 1*a*–1*e* have been identified by similar reference numerals in FIGS. 1*f*–1*h*, although prime notations are added.

The schematic illustrations of FIGS. 1*a*–1*b* show with heavy lines the elements that are subjected to torque. The light lines illustrate the elements that do not carry torque. In first ratio operation, overrunning coupling 16 acts to deliver driving torque from turbine shaft 22 to the intermediate shaft 19. Clutch C3 is engaged, thereby driving the ring gear 14 in the forward driving direction. This imparts a forward driving torque to output shaft 20. Reverse driving torque is imparted to the sun gear shaft 18. With the overrunning coupling OWC2 acting as a reaction point, the ring gear of the second gear unit of the gearset 10 is driven in a forward driving direction, thereby complementing the torque delivered to the output shaft 20 through the carrier for the pinions engaging ring gear 14.

Clutch C3 delivers torque to ring gear 14 through overrunning coupling 16 during operation in the first, third and fifth forward driving ratios (FIGS. 1*a*, 1*c* and 1*d*, respectively). The carrier of the first gear unit of the Simpson gearset delivers torque to the torque output shaft 20. In FIG. 1*a*, the torque on the sun gear shaft 18 is multiplied by the second gear unit of the Simpson gearset as a second torque flow path is established extending to the torque output shaft 20.

Turbine shaft 22 acts as a torque input shaft for the gearset 12. The engine crankshaft 24 is connected drivably to impeller P of a hydrokinetic torque converter. The turbine T of the hydrokinetic torque converter is connected to the turbine shaft 22. A bypass lock-up clutch is designated LUC and the reactor is designated R.

During operation in the second ratio (FIG. 1*b*), brake B1 anchors the sun gear of the simple planetary gearset 12. Turbine torque in shaft 22 then drives the ring gear of the simple planetary gearset 12 with an overdrive ratio as the sun gear of the simple planetary gearset acts as a reaction point. The output torque of the simple planetary gearset then is distributed through engaged clutch C3 to the Simpson planetary gearset.

Third speed ratio (FIG. 1*c*) is achieved by engaging brake B2, which anchors the sun gear shaft 18 of the Simpson planetary gearset. The overrunning coupling of the simple planetary gearset then drives the input ring gear 14 of the Simpson gearset at turbine shaft speed. The second gear unit of the Simpson gearset does not deliver torque as it does in the case of operation in the first and second ratios, where overrunning coupling OWC2 anchors the carrier of the second gear unit of the Simpson gearset.

The fifth ratio (FIG. 1*d*) is a direct drive ratio. It is achieved by engaging simultaneously clutch C2 and clutch C3. All of the brakes are released.

Sixth forward drive ratio operation (FIG. 1*e*) is achieved by engaging brake B1, which anchors the sun gear of the simple planetary gearset. Overrunning coupling 16 freewheels.

The ratio change from the third ratio to the fifth ratio and from the fifth ratio to the third ratio, involves a synchronous shift that is accomplished by engaging clutch C2 and releasing brake B2, or by releasing brake B1 and clutch C3 while applying brake B2.

Reverse ratio is achieved by applying clutch C2 and anchoring the carrier of the second gear unit of the Simpson gearset by applying brake B3. Clutch C2 is applied, so turbine shaft torque is distributed through gearset 12 to the sun gear shaft 18. With the rear carrier anchored, the output shaft 20 and the ring gear for the second gear unit of the Simpson gearset are driven in a reverse direction.

FIGS. 1*f*, 1*g* and 1*h* show schematically a transmission similar to the transmission illustrated in FIGS. 1*a*–1*e* except that the 4-3/3-4 and 5-3 shifts are non-synchronous. That is, the sun gear of the Simpson planetary gearset is anchored by an overrunning coupling shown at C4. The outer race of the overrunning coupling is braked against the transmission case by a pressure-operated friction coupling C4. The elements of the transmission illustrated in FIGS. 1*f*–1*h* that have corresponding elements in the transmission of FIGS. 1*a*–1*e* have been designated by similar reference numerals, although prime notations are added to the elements of FIGS. 1*f*–1*g*.

Figure 2:
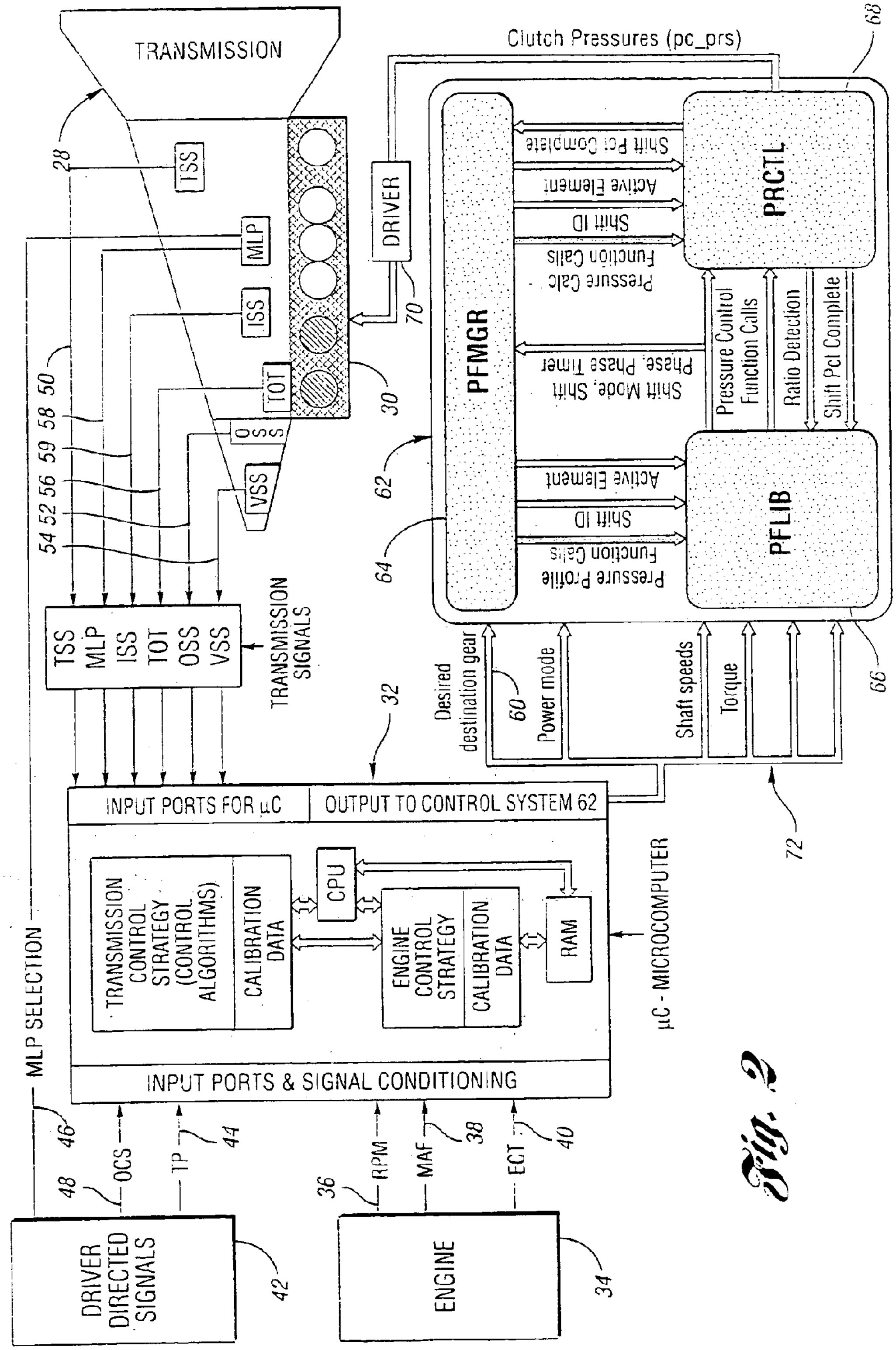
FIG. 2 is a schematic illustration in block diagram form of the overall control system of the powertrain.

The architecture for the control system of the invention is indicated generally in outline form in FIG. 2. The transmission is shown at 28. A transmission hydraulic control circuit for the transmission 28, shown at 30, is under the control of a microprocessor controller 32, which may include both engine control strategy and transmission control strategy. The engine is shown at 34. The input ports and a signal conditioning-portion of the microprocessor 32 receive engine data, such as speed data 36, mass air flow data 38, and engine coolant temperature data 40. Microprocessor 32 also receives selected driver-directed input signals from driver input 42. Typical driver-directed input signals would be the engine throttle position signal 44, the manual lever position selector position 46 and the overdrive cancel switch 48. The manual lever position selector information (MLP) is distributed directly to the transmission 28, which determines a manual valve position signal 58.

The controller 32 receives feedback signals from the transmission including turbine speed sensor signal 50, output shaft speed signal 52, vehicle speed signal 54, transmission oil temperature signal 56, manual valve position signal 58, and intermediate shaft speed signal 59.

The transmission control strategy under the control of the CPU portion of the processor (or controller, or microcomputer $\mu$c) 32 will develop a desired destination gear, as shown at 60. The algorithms executed by the CPU, which are stored in memory registers, are executed in response to the input variables from the driver and the engine, as well as the feedback variables from the transmission, to develop a desired destination gear, which is distributed to the pressure control system indicated generally in FIG. 2 by reference numeral 62.

The control system architecture indicated in FIG. 2 includes a pressure profile manager sub-module 64, a pressure function library sub-module 66, and a pressure control function sub-module 68. Clutch pressure commands are developed by the control system 62 and transferred to output driver 70, which communicates with the hydraulic control system 30 for the transmission 28.

The desired destination gear is developed by the controller 32, and the execution of the destination gear command is carried out by the control system 62. The result of the execution of the input data by the control system 62 involves a command pressure that is delivered to each clutch independently. In an ideal arrangement, there would be one solenoid dedicated to the control of each clutch or friction element in the control system 30 for the transmission 28. The output pressure commanded by the system 62 is based on the desired gear and the current operating conditions, such as transmission temperature, input torque, shaft speeds, etc. These inputs are generally indicated at 72.

The software for control system 62 thus acts as an interface between the output driver circuits of the transmission microprocessor controller 32 and the hydraulic control system 30 of the transmission. It ensures that the appropriate pressure is delivered to each clutch or brake friction element under all driving conditions.

The profile manager 64 provides the highest level of control for the entire pressure control system. It is responsible for processing all changes in the desired gear, during either shifting or non-shifting. It functions as well to control a so-called change-of-mind shift event, where a given gear sequencing is interrupted by a new instruction given by the operator for a different destination gear. For example, if a 1-3 shift is commanded, the control system is configured to command a sequential 1-2-3 shift for normal sequencing. It identifies the active elements, the pressure profiles and the timing of the start of each shift.

The profile library sub-module 66 specifies the pressure control action that is required to apply or to release an element during a shift or an engagement of a clutch or brake. It consists of separate states, such as boost, stroke, closed-loop control, etc., which are needed to complete a shift.

Sub-module 66 comprises a library of several profiles required to complete all shifts or engagements. The profiles that are required for a particular transmission depend upon the kinematic requirements of the transmission. The pressure profiles required for a synchronous shift, for example, are different than those required for a swap-shift.

The pressure control sub-module 68 consists of a collection of algorithms used for the purpose of pressure calculations using the inputs delivered to the system 62. Both the manager 64 and the profile library 66 use calculations in sub-module 68 to monitor the status of each shift and to provide calculations of variables, such as starting torque, to other regions of the pressure control.

The pressure profiles, the selection of transmission elements that are affected during a shift, and the gear sequencing can be changed by appropriately calibrating the program manager 64. Further pressure profiles can be added or deleted depending upon the transmission requirements.

Figures 2A, 2B:
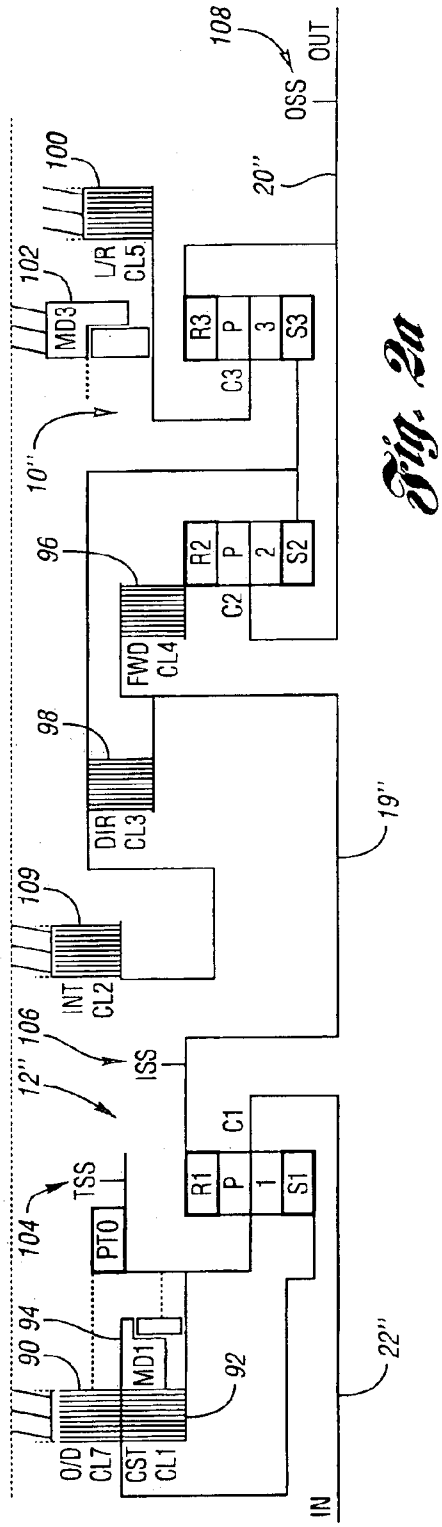
FIG. 2a is a schematic diagram corresponding to the diagrams of FIGS. 1a–1h wherein friction disc brakes are used rather than band brakes for obtaining torque reaction points for the overdrive gearset and the Simpson gearset.
FIG. 2b is a chart showing the ratios for the overdrive gearset and the Simpson gearset, which effect each of six overall forward gear ratios.

FIG. 2*a* is a schematic representation of a modified version of the gearing arrangements shown in FIGS. 1*a*–1*h*. In the case of FIG. 2*a*, the overdrive brake corresponding to brake B1 is shown at 90. It is a multiple disc friction brake, which anchors the sun gear S1 of the first overdrive planetary gearset 12". As in the case of the description of FIGS. 1*a*–1*h*, similar reference characters are used in FIG. 2*a* to designate elements that are common to the gearing arrangements of FIGS. 1*a*–1*h*, although double prime notations are added in the case of FIG. 2*a*.

The coast clutch 92 corresponds to coast clutch C1 of FIGS. 1*a*–1*h*. The overrunning coupling schematically shown in FIG. 2*a* is a disc-type planar clutch 94, which corresponds to the overrunning coupling for the overdrive gear unit 12 of FIGS. 1*a*–1*h*.

Forward clutch 96 in the embodiment of FIG. 2*a* corresponds to the forward clutch C3 in the embodiments described previously. A direct clutch 98 in FIG. 2*a*, like the forward clutch 96, is a disc clutch. It corresponds to clutch C2 in the embodiments described previously. Low-and-reverse brake 100 in FIG. 2*a* corresponds to band brake B3 in the previously described embodiments. An overrunning coupling in the form of a disc-type planar clutch 102 complements a braking action of brake 100 by providing one-way torque reaction for the carrier C3 of gearset 10".

In the case of the design of FIG. 2*a*, a turbine speed sensor 104 (TSS) monitors the speed of the turbine-driven torque input shaft 22". A second speed sensor 106 (ISS) monitors the speed of the intermediate shaft (input to Simpson gearset) 19", which corresponds to the speed of ring gear R1. A third speed sensor 108 (OSS) monitors the speed of output shaft 20". The three speed sensors are used to implement the control strategy which will be described subsequently.

FIG. 2*b* is a chart that shows the ratios for one embodiment of the invention together with the individual speed ratios of the Simpson gearset and the overdrive gearset. These values are given for each of six forward ratios, although, as explained previously, the use of five ratios or six ratios is a design choice that can be made depending upon whether the total overall gear ratio difference for the fourth and the fifth gears is desired for any particular powertrain installation.

Figure 3:
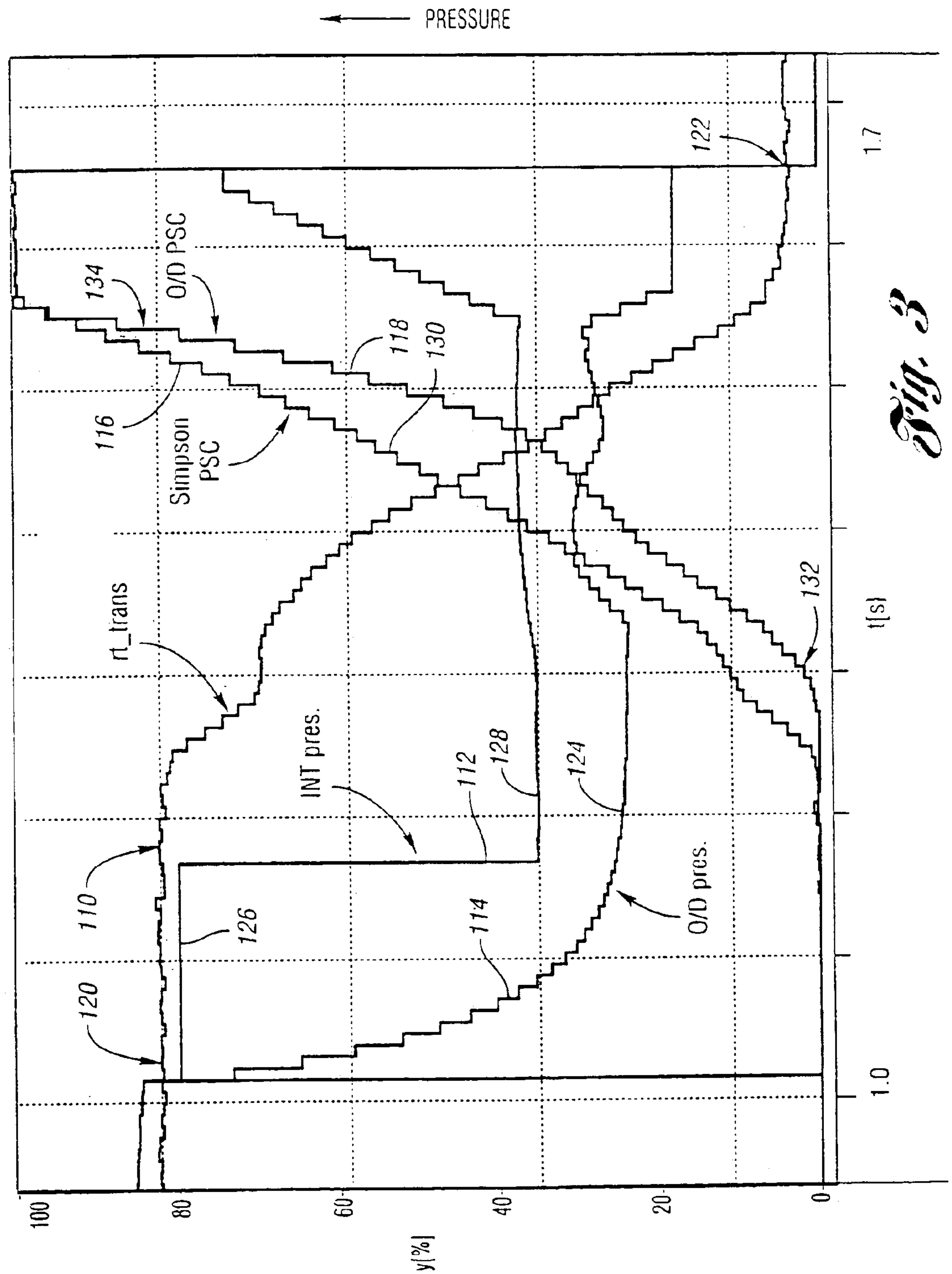
FIG. 3 is a plot of overdrive friction element pressure, intermediate element pressure, overall transmission ratio, and percent shift complete plots for both the overdrive and the Simpson gearsets, each plot being a function of time during a swap-shift sequence.

FIG. 3 is a plot of the overdrive clutch pressure, the intermediate clutch pressure, the overall transmission ratio, and the percent shift completion plots for the Simpson gearset and the overdrive gearset during a 2-3 upshift event. The shift progression, expressed as percentages, is shown on the ordinate of FIG. 3, together with pressure. The overall transmission ratio is plotted as shown at 110, the pressure of intermediate clutch 109 is plotted as shown at 112, the pressure of overdrive clutch 90 is plotted as shown at 114, the percent shift complete at any instant during a shift event for the Simpson gearset is shown at 116, and the percent shift complete for the overdrive gearset at any instant during the shift event is shown at 118. Clutch 109 corresponds to brake B2 in FIGS. 1*a*–1*d* and B2 or C4 in FIG. 1*f*. At the beginning of the shift, the overall transmission ratio at point 120 in the embodiment of the invention described with reference to FIG. 2*b* is 2.201. At the end of the shift, at point 122, the overall transmission ratio for the transmission described with reference to FIG. 2*b* is 1.538. To effect a 2-3 upshift, the overdrive friction element must be released and the Simpson gearset friction element must be applied. Thus, the overdrive pressure shown at 114 is dropped, beginning at point 120, until it reaches a low value, as shown at 124.

Intermediate clutch pressure is distributed to the intermediate friction element at a high value following initiation of the shift, as shown at 126. This high value is needed to fill the clutch and stroke the clutch so that torque capacity can be increased. The value for the intermediate clutch pressure is dropped after the initial pressure build-up to a low value, as shown at 128. This low pressure value corresponds to the theoretical starting torque needed to start the ratio change of the Simpson gearset. The Simpson gearset then begins its ratio change, and the percent shift complete for the Simpson gearset, shown at 116, begins to rise almost linearly, as shown at 130.

When the overdrive gearset clutch pressure falls to a low value, as shown at 124, the overdrive gear ratio will begin to change. As demonstrated by the overdrive percent-shift-complete curve 118, the point 132 at which the overdrive gearset begins its ratio change is later than the beginning of the application of the intermediate clutch of the Simpson gearset.

The completion of the shift of the overdrive gearset at point 134 on the plot 118 occurs earlier than the completion of the application of the Simpson gearset intermediate clutch.

The data in FIG. 3 represent actual readings recorded in a test set-up for a transmission embodiment of the type shown in FIGS. 2*a* and 2*b*.

For the purpose of schematically illustrating the software that will accomplish the swap-shifts, including the power-on 2-3 upshift described with reference to FIG. 3, a swap-shift will first be described with reference to FIGS. 4*a*, 4*b* and 4*c*. A corresponding description for a power-on 3-2 swap-downshift will be described with reference to FIGS. 5*a*, 5*b* and 5*c*.

For purposes of the description of a swap-shift with reference to FIGS. 4*a*–5*c* and FIGS. 7*a*–8*b*, the Simpson gearset may be referred to as the main gearset and the overdrive gearset may be referred to as the auxiliary gearset.

One objective of the software for controlling swap-upshifts and swap-downshifts is to envelop the downshift of the overdrive gearset within the time frame for an upshift of the Simpson gearset. Similarly, overdrive gearset upshifts will be enveloped within the time frame for a downshift of the Simpson gearset. Further, the rate of ratio change of the overdrive gearset must be less than the rate of ratio change of the Simpson gearset. Also, the start of the downshift of the overdrive gearset ideally should be set as close as possible to the start of the Simpson gearset upshift. Similarly, the end of the downshift of the overdrive gearset must be set as close as possible to the end of the Simpson gearset upshift.

Figures 4A, 4B, 4C:
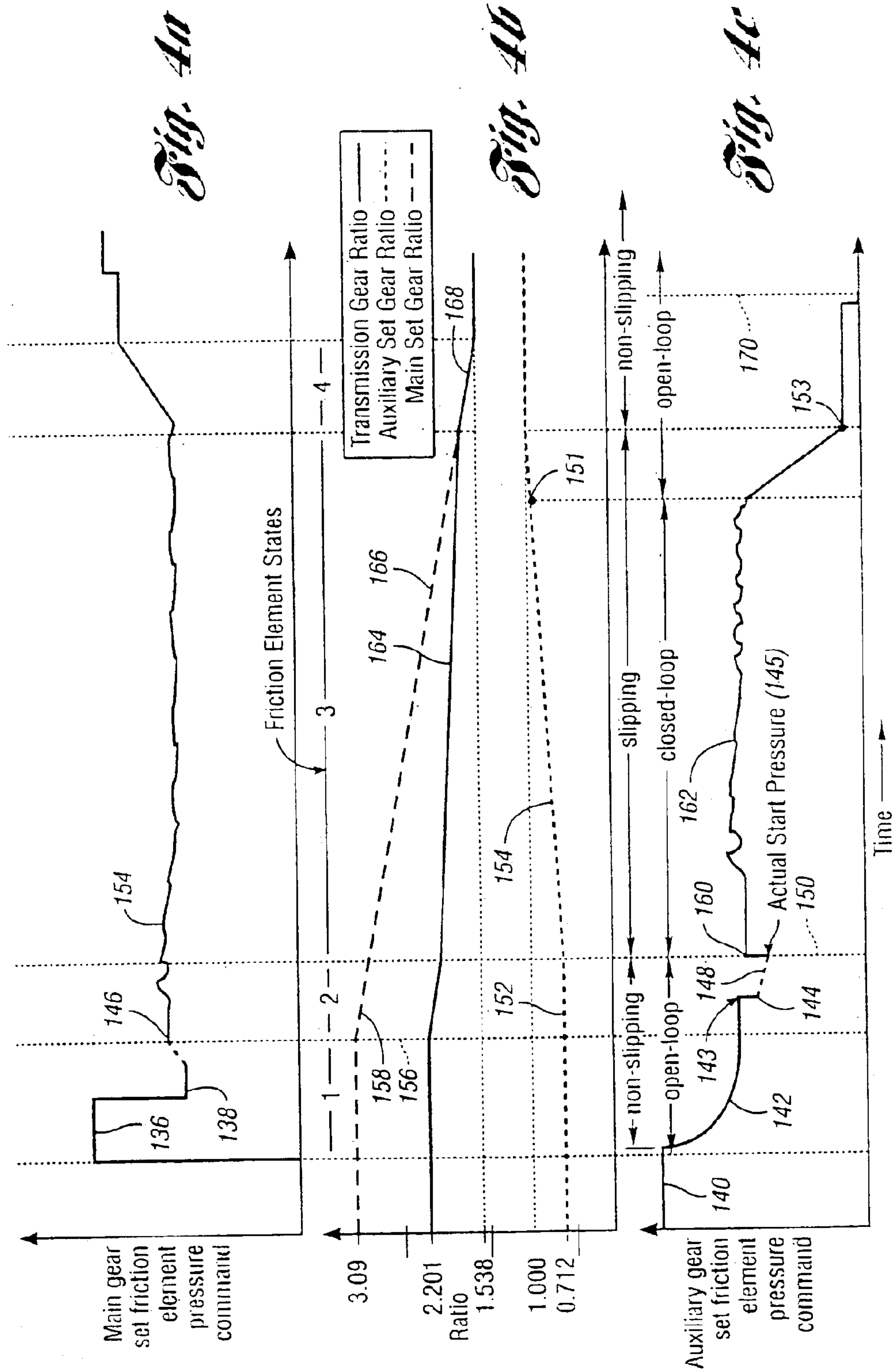
FIG. 4a is a time plot of the Simpson gearset friction element pressure command versus time during a power-on swap-upshift.
FIG. 4b is a time plot of overall ratio as well as overdrive gearset ratio and Simpson gearset ratio during a power-on swap-upshift as a function of time.
FIG. 4c is a time plot of the overdrive gearset friction element pressure command during a power-on swap-upshift.

In FIG. 4*a*, the Simpson gearset friction element pressure command increases the friction element pressure, as shown at 136. This high pressure will initiate the engagement of the Simpson gearset friction element. The friction element is stroked so that torque capacity is gained. The Simpson gearset friction element pressure then is commanded to a low value, as shown at 138. This low value corresponds to the theoretical starting pressure needed to start the Simpson gearset ratio change. Simultaneously, the overdrive gearset friction element pressure command, which initially was at a value at least high enough to ensure that the friction element for the overdrive set is not slipping, even during input torque changes, and to maintain capacity of the weakest friction element in the transmission. Overdrive gearset friction element command pressure at 140 in FIG. 4*c* is gradually decreased, as shown at 142, until it reaches a low value, as shown at 143. This value is slightly above the theoretical starting pressure at 144, which would start the overdrive gearset ratio change. Prior to the decrease in the overdrive gearset friction element pressure from 143 to 144, the Simpson gearset friction element pressure can be commanded to rise, as shown at 146 in FIG. 4*a*, until the Simpson gearset ratio change starts. As soon as the Simpson gearset ratio progression proceeds to a point selected by a calibrator of the system, the overdrive gearset pressure is commanded to a value at 144 in order to start the overdrive gearset ratio change.

At 143, there is sufficient capacity in the overdrive gearset so that the overdrive gearset will not begin its ratio change. After the overdrive gearset friction element pressure is commanded to the starting pressure at 144, the pressure of the overdrive gearset is gradually reduced in friction element state 2, as shown at 148 in FIG. 4*c*, to ensure that the overdrive gearset ratio change will start at time 150.

The overdrive gearset ratio plotted in friction element state 2 in FIG. 4*b* is a straight line. The overdrive gearset ratio begins to rise, as shown at 154, only after the time that the downshift of the overdrive gearset begins at 150.

The Simpson gearset friction element pressure enters closed-loop control, as shown at 154, beginning at time 156. Starting at time 156, the slope of the Simpson gearset ratio becomes negative, as shown at 158. The ratio change of the Simpson gearset is controlled by the controller in a closed-loop fashion, and the rate of change of the transmission ratio will follow that of the Simpson gearset ratio since the overdrive gearset has not started its downshift prior to the time 150.

Figure 7A:
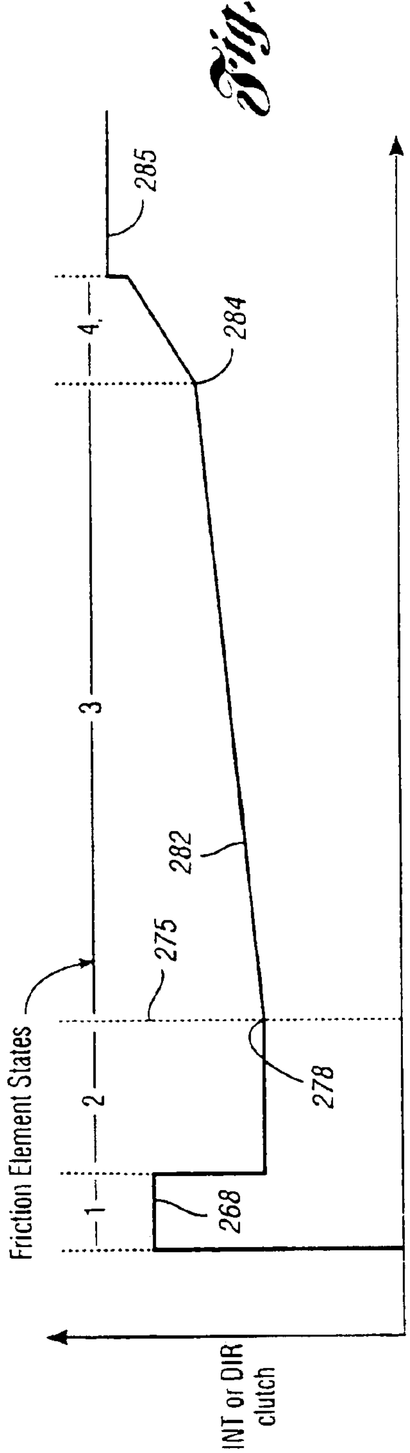
FIG. 7*a* is a time plot of the Simpson gearset friction element pressure command versus time during a power-off swap-upshift.
Figure 7B:
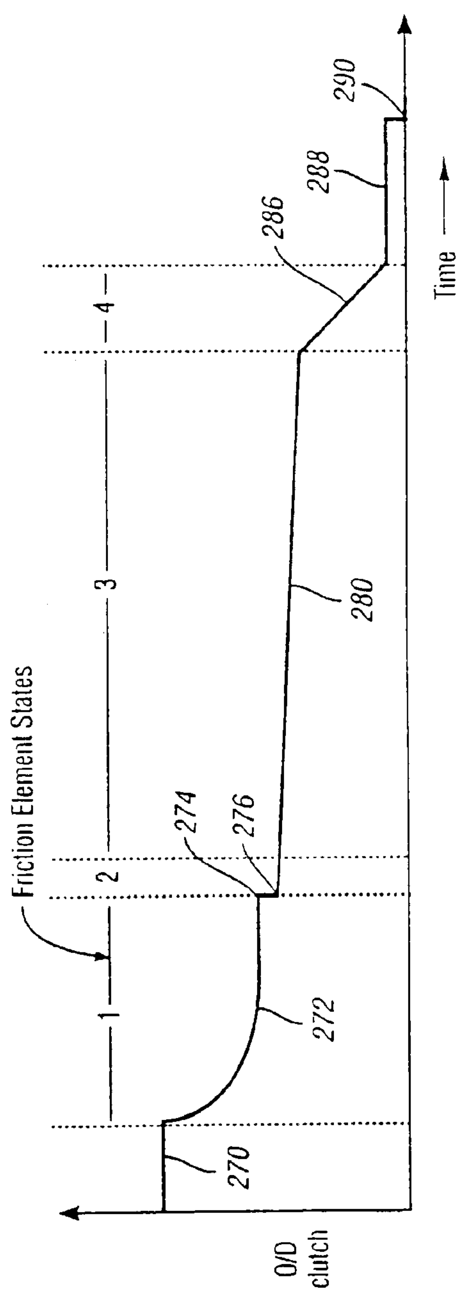
FIG. 7*b* is a time plot of the overdrive gearset friction element pressure command during a power-off swap-upshift, the pressure being controlled in an open-loop manner.

The plot of FIGS. 4*a*, 4*b* and 4*c* represents a power-on upshift, which uses closed-loop control. A power-off upshift would not use a closed-loop control. Rather, it would use open-loop control, as shown in FIGS. 7*a* and 7*b*.

The commanded pressure for the overdrive gearset at time 150 is the actual starting pressure 145, which causes the overdrive gearset ratio change to start. After the overdrive gearset ratio change starts at time 150, the pressure is immediately commanded to rise to a slightly higher value at 160 to account for changes in the dynamics of a change in coefficient of friction (i.e., static vs. dynamic coefficients of friction). The increased pressure following the decrease at 148 will avoid a flare-up in the speed of sun gear of the overdrive gearset at the beginning of the downshift of the overdrive gearset. At that point, closed-loop control of the overdrive gearset will begin, as shown at 162 in the case of a power-on 2-3 upshift. If the upshift occurs with power-off, when engine power delivery to the traction wheels is interrupted (the overrunning clutches overrun), the control would be open-loop.

As indicated at the central regions of FIGS. 4*a*, 4*b* and 4*c*, there is a simultaneous ratio change for both the Simpson gearset upshift and the overdrive gearset downshift. The overdrive gearset downshift is achieved by controlling the pressure of the friction element. Once the overdrive gearset begins its downshift, the transmission rate of ratio change will decrease, as shown at 164. The Simpson gearset and the overdrive gearset dynamically interact with each other during this simultaneous ratio change, as will be explained subsequently. During a power-on 2-3 upshift, the ratio change control for the Simpson gearset and the overdrive gearset is handled by two coupled closed-loop controllers shown at the lower right-hand corner of FIG. 6 and the upper right-hand corner of FIG. 6, respectively. A power-off shift, in contrast, uses an open-loop control at this time.

The overdrive (auxiliary) gearset time plot is shown in FIG. 4*c*. At time 151 in FIG. 4*c*, the selectable overdrive progression is reached. The control from time 150 to 151 is closed-loop. The control from time 151 to the end of the upshift is open-loop. This occurs in FIG. 4*c* during friction element state 3. Control of pressure before time 150 in friction element state 1 also is open-loop. During closed-loop control, the friction element for the overdrive (auxiliary) gearset is slipping. Slipping stops at time 153 after the pressure is ramped down to zero slip using open-loop control. The friction element state beginning at time 153 is identified in FIG. 4*c* as state 4.

The actual start pressure for the overdrive gearset friction element occurs at 145 following the pressure ramp-down at 148.

The overdrive gearset should finish its downshift before the Simpson gearset finishes its upshift. When that occurs, the overall ratio change, as shown at 164, will follow the ratio change for the Simpson gearset, as indicated at 168. The upshift is completed at time 170.

Figures 5A, 5B, 5C:
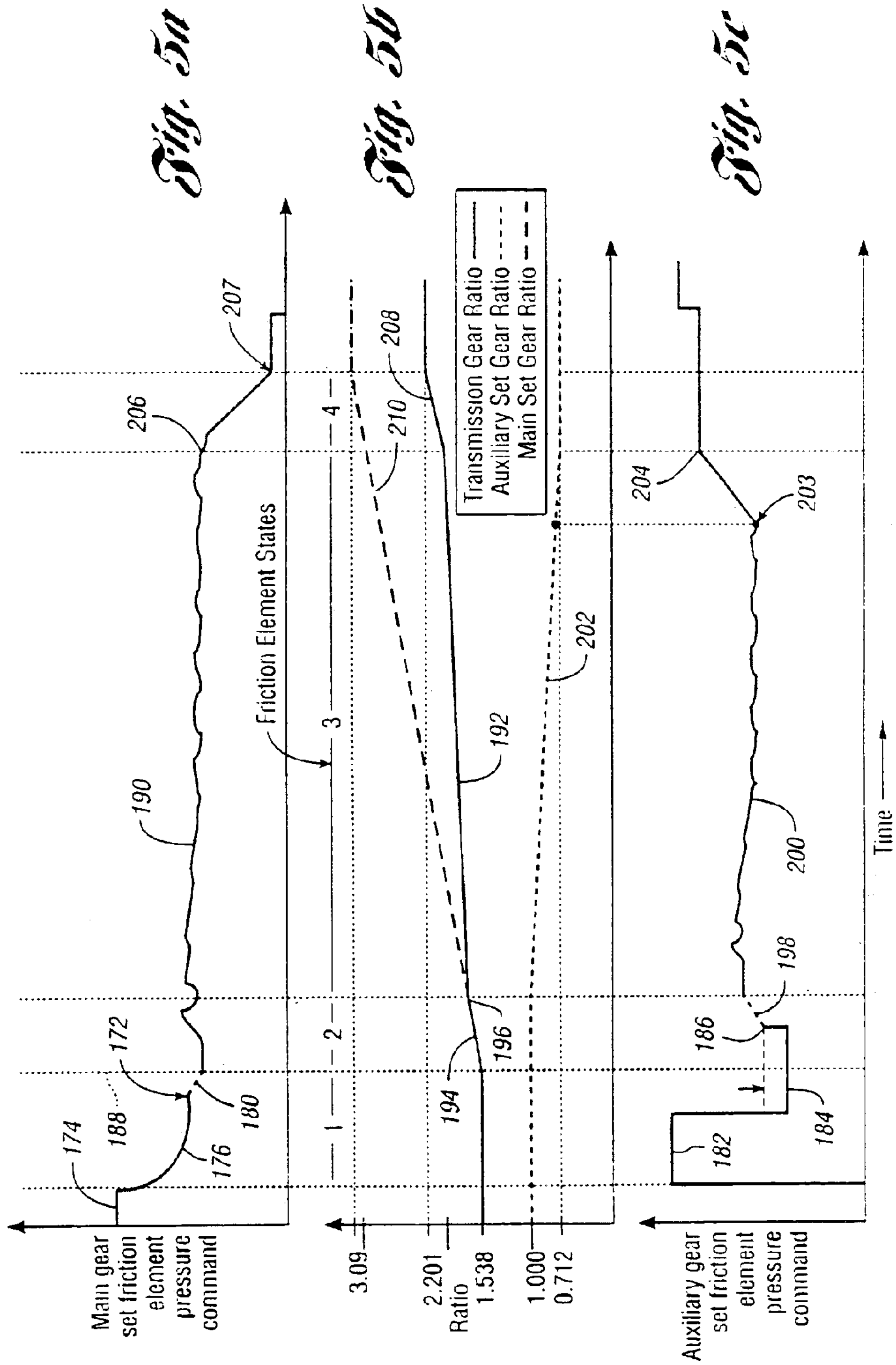
FIG. 5a is a plot corresponding to FIG. 4a, but which shows the Simpson gearset friction element pressure command during a power-on swap-downshift.
FIG. 5*b* is a plot corresponding to FIG. 4*b* showing the overall gear ratio, the overdrive gear ratio, and the Simpson gear ratio during a power-on swap-downshift.
FIG. 5*c* is a plot corresponding to FIG. 4*c* showing the overdrive gearset friction element pressure command during a power-on swap-downshift.

FIG. 5*a* is a plot of the Simpson gearset friction element pressure command during a downshift as distinct from the upshift described with reference to FIGS. 4*a*, 4*b* and 4*c*. FIG. 5*a* shows that the Simpson gearset is prepared for its ratio change by reducing the capacity of the friction element down to its starting pressure at 172. At the beginning of the downshift, the pressure is at a high value as shown at 174. That pressure is high enough to ensure that the Simpson gearset friction element pressure command will prevent slipping. It will maintain capacity of the weakest friction element in the transmission.

The pressure is gradually decreased, as shown at 176, to maintain stability and avoid hunting of the pressure value due to pressure overshoot. The pressure of the Simpson gearset friction element is mildly ramped down, as shown at 180, to start the downshift of the Simpson gearset, which occurs at time 188. In the case of the overdrive gearset, a swap-downshift requires an initial boost in the overdrive clutch pressure, as shown at 182, to condition the overdrive gearset friction element for torque delivery. The pressure then is dropped, as shown at 184, to a value below the starting pressure indicated at 186. This ensures that the commanded pressure will not start the upshift of the overdrive gearset.

The downshift of the Simpson gearset will begin at time 188, as shown in FIG. 5*a*. The ratio change in the Simpson gearset will be accomplished by controlling pressure in a closed-loop fashion, as shown at 190. The rate of the transmission ratio change indicated at 192 will follow the rate of change of the Simpson gearset ratio, as shown at 194, at the beginning phase of the Simpson gearset downshift. At point 196 in FIG. 5*b*, the transmission ratio will begin to have a lesser slope because the overdrive gearset now begins to change its ratio. As in the case of a power-on swap-upshift, the pressure is controlled for both the Simpson gearset and the overdrive gearset during a downshift in a closed-loop fashion, whereas open-loop control is used for power-off downshifts.

As previously explained, the friction element pressure for the overdrive gearset initially is held below its starting pressure (186) until the Simpson (main) gearset ratio progression reaches a calibrated shift progression point, at which time the overdrive friction element pressure is commanded at pressure level 186 to start the overdrive gearset ratio change. To ensure that the overdrive gearset ratio change starts, pressure is ramped up, as shown at 198 until the overdrive gearset ratio change is detected, at which point overdrive gearset ratio change closed loop control begins. This upward ramping of the starting pressure is done in order to accommodate any errors in the starting pressure that may exist.

During closed-loop control of the overdrive gearset, as shown at 200 in FIG. 5*c*, the overdrive gearset ratio will decrease as shown at 202 in FIG. 5*b*. As soon as the slope of the overdrive gearset ratio becomes negative, the transmission gear ratio slope will decrease as shown at 192, since both the overdrive gearset and the Simpson gearset are changing ratios.

During the closed-loop control indicated at 190 and at 200 in FIGS. 5*a* and 5*c*, respectively, the Simpson gearset and the overdrive gearset dynamically interact with each other during their simultaneous ratio changes.

At point 203, after a calibratable overdrive gearset shift progression is reached, closed-loop control for the overdrive gearset is stopped. Overdrive friction element pressure then is ramped up for the remainder of the overdrive gearset ratio change at 204.

As indicated in FIG. 5*c* at 204, the overdrive gearset is finished with its ratio change, which is an upshift, and the Simpson (main) gearset has not yet finished its ratio change, which is a downshift, as shown at 207 in FIG. 5*a*. After the overdrive gearset ratio change is completed, the slope of the gear ratio plot for the Simpson gearset follows the slope of the plot of the transmission gear ratio, as shown at 208. The gear ratio for the Simpson gearset being shown at 210 in FIG. 5*b*. At point 206, after a calibratable Simpson gearset shift progression is reached, closed-loop control for the Simpson gearset is stopped. Simpson gearset friction element pressure is ramped down for the remainder of the Simpson gearset ratio change, as shown at 207.

The control methodology for a 2-5 swap-shift is the same as that for the 2-3 swap-shift. Similarly, the control methodology for a 5-2 swap-shift is the same as that for a 3-2 swap-shift.

Figure 6:
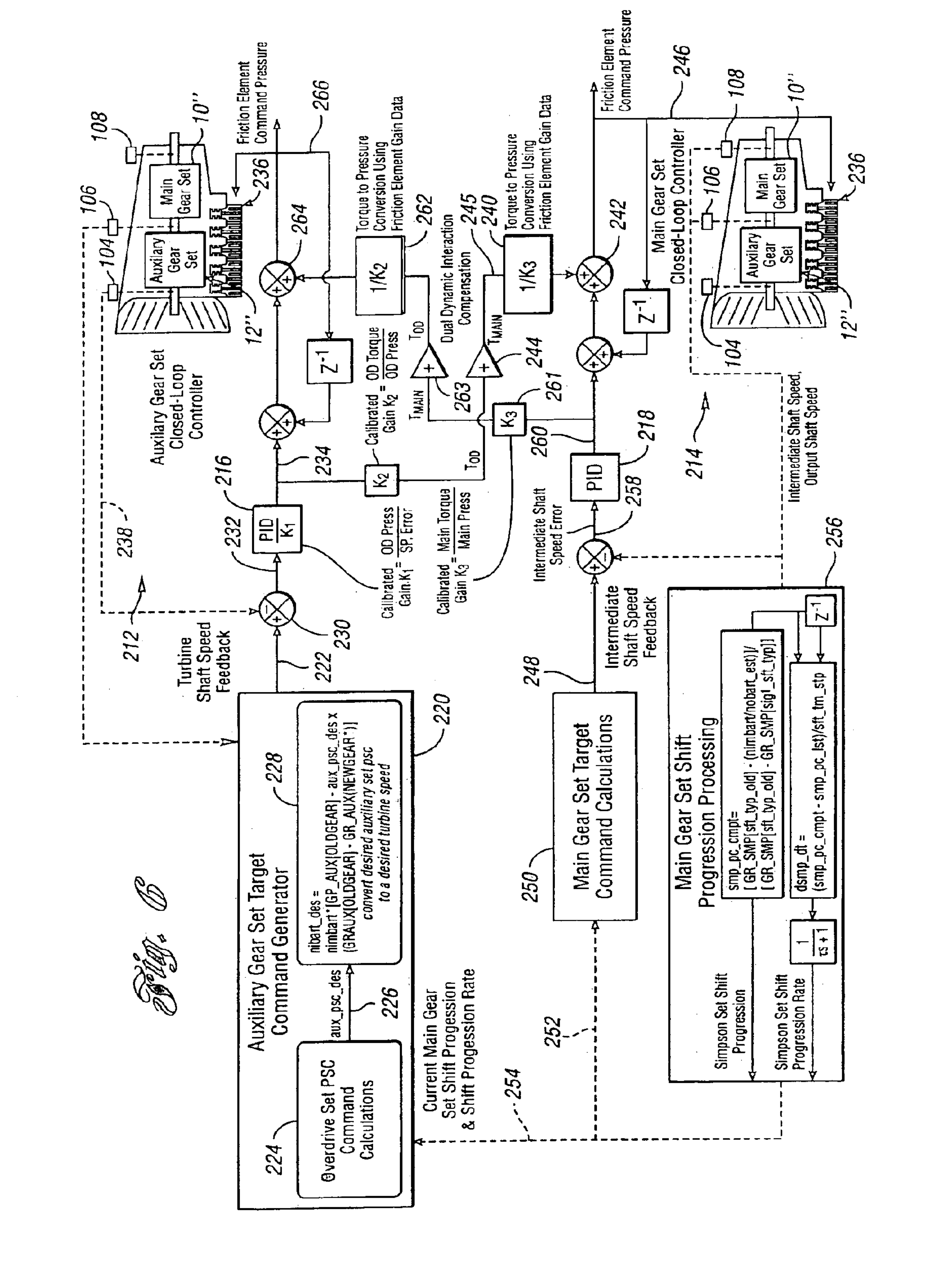
FIG. 6 is a schematic diagram of the overall coordinated closed-loop control system for a swap-shift, with dual dynamic interaction compensation.

The closed-loop coordinated control for the overdrive (auxiliary) gearset and the Simpson (main) gearset is illustrated in schematic form in FIG. 6. The overdrive (auxiliary) gearset closed-loop controller is shown in FIG. 6 at 212 and the Simpson (main) gearset closed-loop controller is shown at 214. Each gearset has its own PID (proportional, integral, derivative) controller. Any of several closed loop controllers can be used, including ratio based controllers and PID controllers. A PID controller for the overdrive gearset is shown at 216 and a PID controller for the Simpson gearset is shown at 218.

An auxiliary gearset target command generator 220 monitors the progression of the shift in the Simpson gearset. It computes a target command for the overdrive gearset controller. It calculates a desired turbine speed, shown at 222, using desired overdrive gearset percentage shift complete command calculations, shown at 224. The output of the calculations at 224 is a desired percent shift complete value at 226. That value is converted to a desired turbine speed, as shown at 228. The conversion of speed error at 232 to pressure at 234 is computed at 216 using a gain factor $K_1$, which is a calibrated value equal to OD pressure divided by turbine speed error.

The actual turbine speed is measured by a sensor 104 and is compared at comparator 230 to the desired turbine speed 222. Any error in these speed values is seen at 232 and is distributed to the PID controller 216. The output of the PID controller is a pressure value at 234, which is distributed to the solenoid-operated pressure control valves at 236 for the overdrive gearset. The turbine speed feedback control loop is shown at 238. Calibrated gain data $K_2$ is used to convert pressure to torque for the overdrive (auxiliary) gearset, where $K_2$=overdrive torque/overdrive pressure. Calibrated gain $K_3$ is used to convert pressure to torque for the Simpson (main) gearset, where $K_3$=Simpson gearset friction element torque/Simpson pressure.

The computed overdrive gearset pressure at the output side of the PID controller 216 is converted to overdrive gearset friction element torque using K2, then converted to Simpson gearset friction element torque (245) using swap-crosslink gain 244 to account for dynamic interaction between the two gearsets. Simpson element torque 245 is converted to Simpson element pressure 240 by dividing by gain $K_3$. The output of the torque-to-pressure conversion is distributed to summing point 242, which, in turn, is distributed as shown at 246 to the solenoid-operated pressure control valves for the main gearset at 236. This feature is part of the dual dynamic interaction compensation for disturbances from the desired pressure build-up or pressure decrease in the overdrive gearset, which will have an effect on the pressure build-up or the pressure decrease for the Simpson gearset.

The closed loop control system 214 for the Simpson gearset includes a control unit for determining desired intermediate shaft speed at 248. The desired speed at 248 is determined at 250 where the Simpson gearset target command calculations occur. This is done using shift progression rate calibration using test data to determine a desired rate. That value is integrated with respect to time to produce a desired shift progression value, which is then converted to a desired intermediate shaft speed.

The Simpson gearset shift progression and shift progression rate are monitored at 256 using outputs from the speed sensors 106 (ISS in FIG. 2*a*) and 108 (OSS in FIG. 2*a*). The Simpson gearset shift progression monitored at 256 affects the Simpson gearset target command calculations at 250 as well as the overdrive gearset target command calculations at 220.

The desired intermediate shaft speed at 248 is compared to the intermediate speed monitored by the speed sensor 106. The intermediate shaft speed error at 258 is distributed to controller 218. Conversion from an error to pressure 218 is accomplished using gain data in a fashion similar to the conversion explained previously with respect to controller 216. The output of the controller 218 is a pressure at 260, which is converted to a Simpson (main) torque using gain $K_3$ at 261, and then converted to an overdrive gearset friction element torque using swap-crosslink gain at 263 to account for dynamic interaction between the two gearsets. Overdrive gearset torque at 263 is converted to overdrive gearset element pressure at 262 by dividing by gain $K_2$.

The pressure at 262 is distributed to summing point 264, thus modifying the pressure distributed to the overdrive gearset friction element, as shown at 266.

The symbol $Z^{-1}$ at function block 256 represents the last Simpson gearset shift progression from the last control loop.

The symbol $Z^{-1}$ at the Simpson gearset controller 214 and at the overdrive gearset controller 212 represent feedback information from the last control loop as the controllers 214 and 212 compute their respective friction element command pressure. That feedback information is combined with the outputs of PID controllers 216 and 218 to update the friction element command pressures for the overdrive gearset friction element command pressure and the Simpson gearset friction element command pressure, respectively. The command pressures are computed for each control loop of the system.

FIG. 7*a* is a time plot of the intermediate or direct clutch pressure during a power-off swap-upshift. The corresponding time pressure plot for the overdrive clutch is shown in FIG. 7*b*. The clutch pressure for the Simpson gearset is boosted, as shown at 268, at the beginning of the upshift event, which prepares the friction element for activation. The overdrive clutch pressure, which initially was on, as shown at 270, is gradually reduced in friction element state 2, as shown at 272, to a value at 274, which is slightly greater than the starting pressure at 276. The pressure on the friction element for the Simpson gearset is decreased to a starting pressure value at 278. The pressure at 274 for the overdrive clutch is just sufficient to make certain that the overdrive gearset does not shift until after the Simpson gearset begins its shift. Once the Simpson gearset begins its ratio change at time 275, overdrive clutch pressure is reduced to starting pressure 276.

The pressure on the overdrive clutch is gradually decreased, as shown at 280, in an open-loop fashion. This occurs simultaneously with a gradual increase in pressure for the Simpson gearset in an open-loop fashion, as shown at 282. Prior to the end of the pressure build-up ramp for the Simpson gearset at 284, the pressure on the overdrive clutch is decreased in friction element state 4, as shown at 286, to a stroking pressure at 288 followed by complete clutch disengagement at 290. After the Simpson gearset pressure is ramped for a calibratable time in friction element state 4, the pressure on the Simpson gearset clutch is increased to its full value at 285.

Figure 8A:
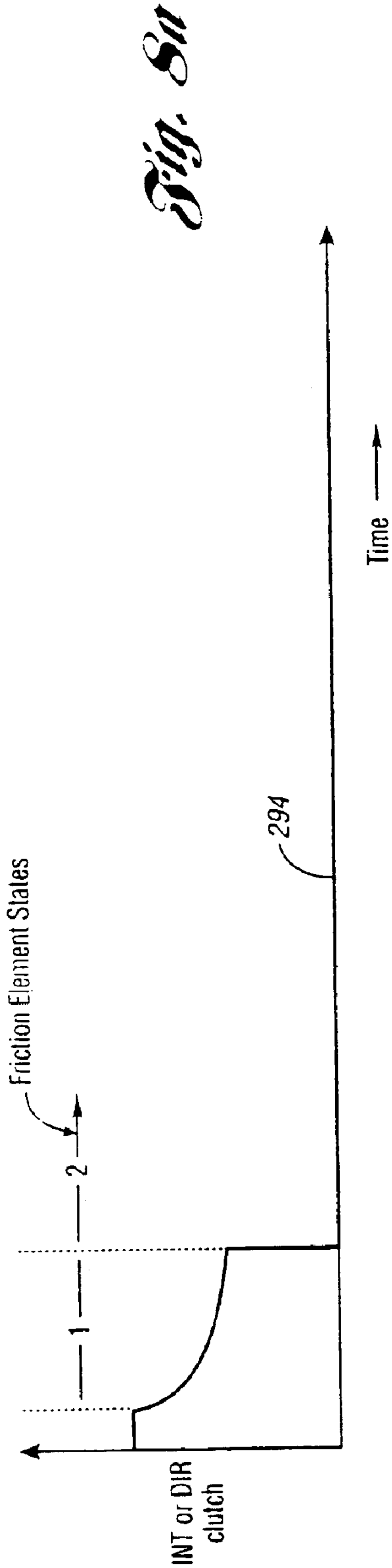
FIG. 8*a* is a time plot of the open-loop control of the Simpson gearset friction element pressure during a power-off swap-downshift.
Figure 8B:
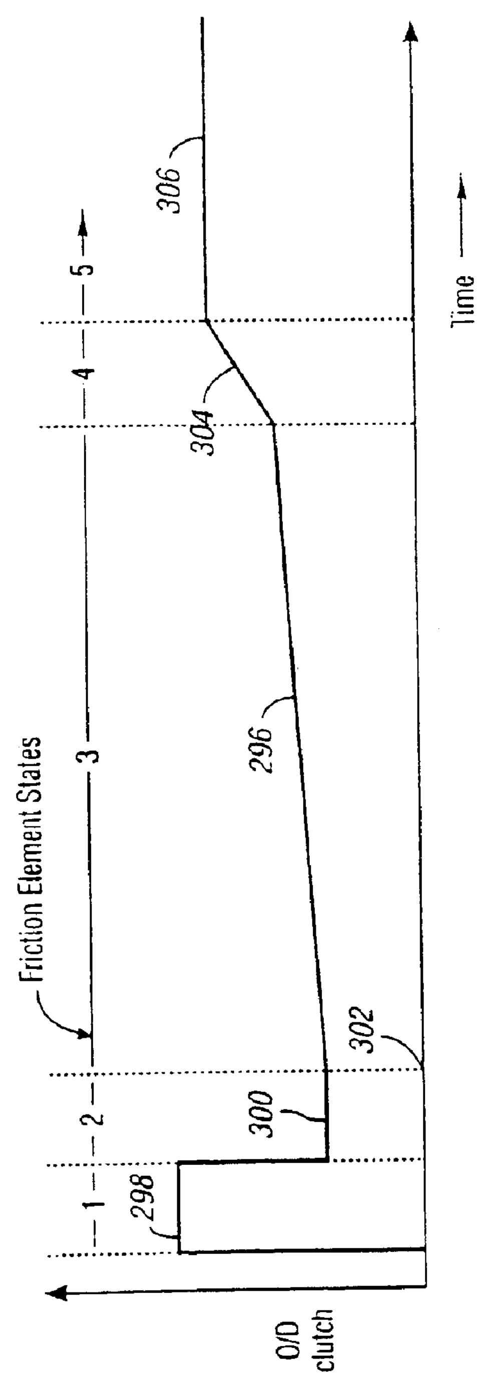
FIG. 8*b* is a time plot of the open-loop control of the overdrive gearset friction element pressure during a power-off swap-downshift.

A power-off downshift is illustrated in the plots of FIGS. 8*a* and 8*b*. The intermediate or direct clutch of the Simpson gearset is off-going. In FIG. 8*a*, unlike the power-on downshift described with reference to FIGS. 5*a*, 5*b* and 5*c*, the friction element pressure for the Simpson gearset is set at zero as shown at 294. That is due to the fact that reverse torque transfer is not possible because of the overrunning couplings.

The pressure on the overdrive clutch during a power-off downshift is ramped upward in an open-loop fashion, as shown at 296 in FIG. 8*b*. As in the case of a power-on downshift of the overdrive gearset, the overdrive clutch is boosted to prepare the friction element during the initial phase of the swap-shift, as shown at 298, and is dropped to a starting pressure level at 300 until time 302 to start the shift. During the inertia phase of the shift corresponding to the ramping of clutch pressure at 296, the capacity of the overdrive clutch reaches a level that nearly ends the slipping of the clutch. The pressure then is ramped up at 304 to the fully engaged pressure at 306.

Figure 9A:
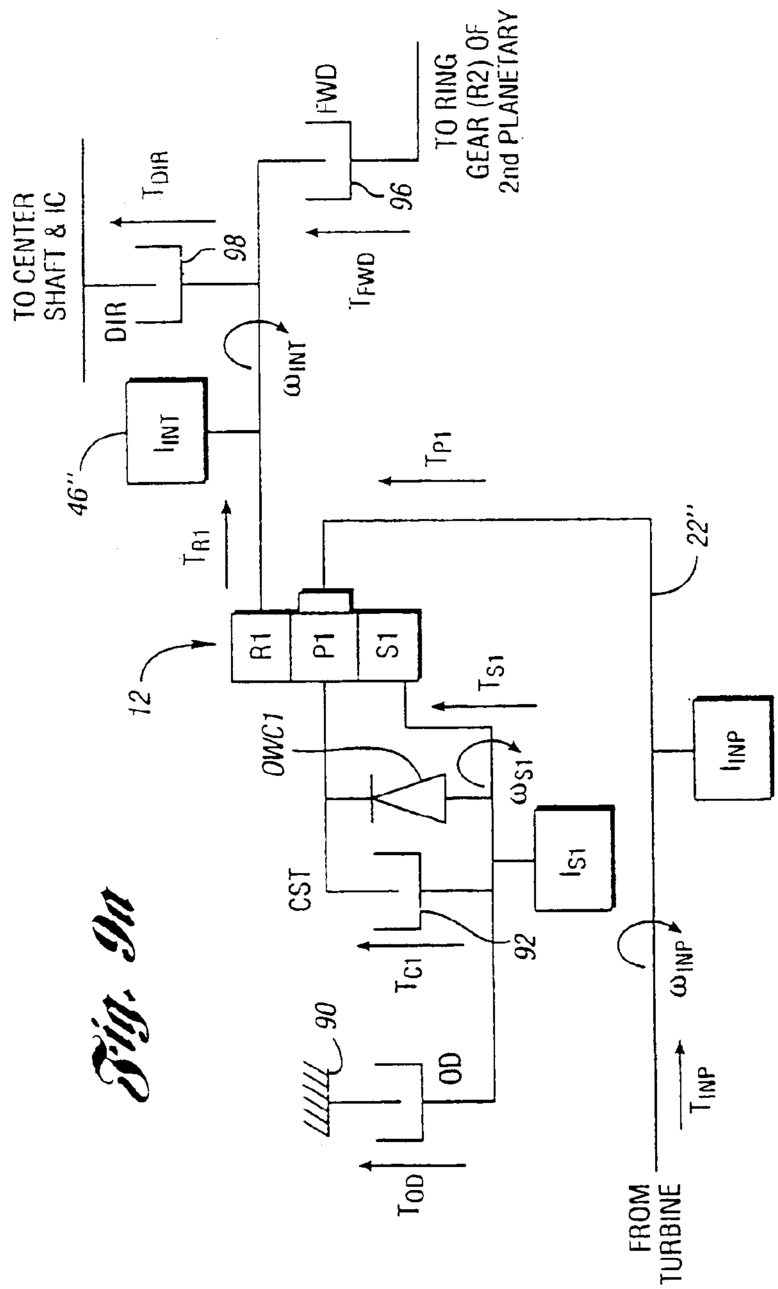
FIG. 9*a* is a schematic diagram of the gearing elements of the overdrive gearset indicating the terms used in swap-shift starting torque calculations for the friction elements of the overdrive and Simpson gearsets affected by rotary inertia torque.

FIG. 9*a* is a schematic representation of the elements of the overdrive gearset that are affected by rotary inertia torque. The labels for the torque values for the elements associated with the overdrive gearset are indicated. A corresponding schematic representation for the elements of the Simpson gearset that are affected by rotary inertia torque is shown in FIG. 9*b*. For example, the term $T_{OD}$ represents torque carried by the overdrive clutch. The symbol $T_{C1}$ represents the torque on the coast clutch 92 and the OWC1 combination. The torque on the sun gear $S_1$ is represented by the symbol $T_{S1}$. The planetary carrier torque for the overdrive gearset is designated by the symbol $T_{P1}$. The forward clutch torque is represented by the symbol $T_{FWD}$. The angular velocity of the intermediate shaft and the ring gear $R_1$ of the overdrive gearset is represented by the symbol $\omega_{INT}$. The symbol representing the angular velocity of the input turbine shaft is shown in FIG. 9*a* as $\omega_{INP}$. The angular velocity of the sun gear of the overdrive gearset is represented by the symbol $\omega_{S1}$. Corresponding symbols are used in the schematic diagram of the elements of the Simpson gearset in FIG. 9*b*. These symbols will be included in the following description of the swap-shift starting torque calculations.

Figure 9C:
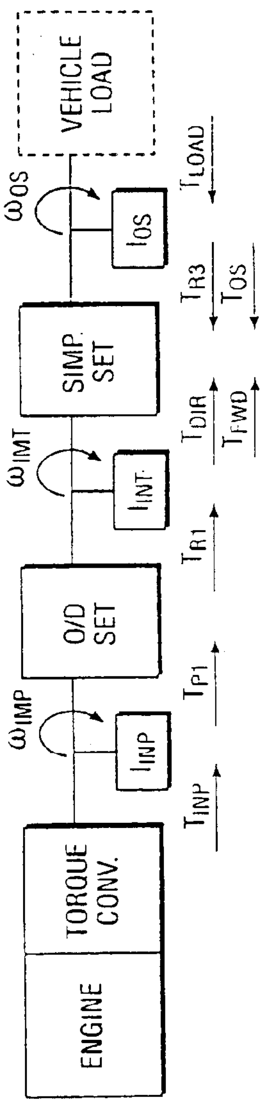
FIG. 9*c* is a schematic block diagram of the powertrain indicating terms used in the swap-shift starting torque calculations.
Figure 9B:
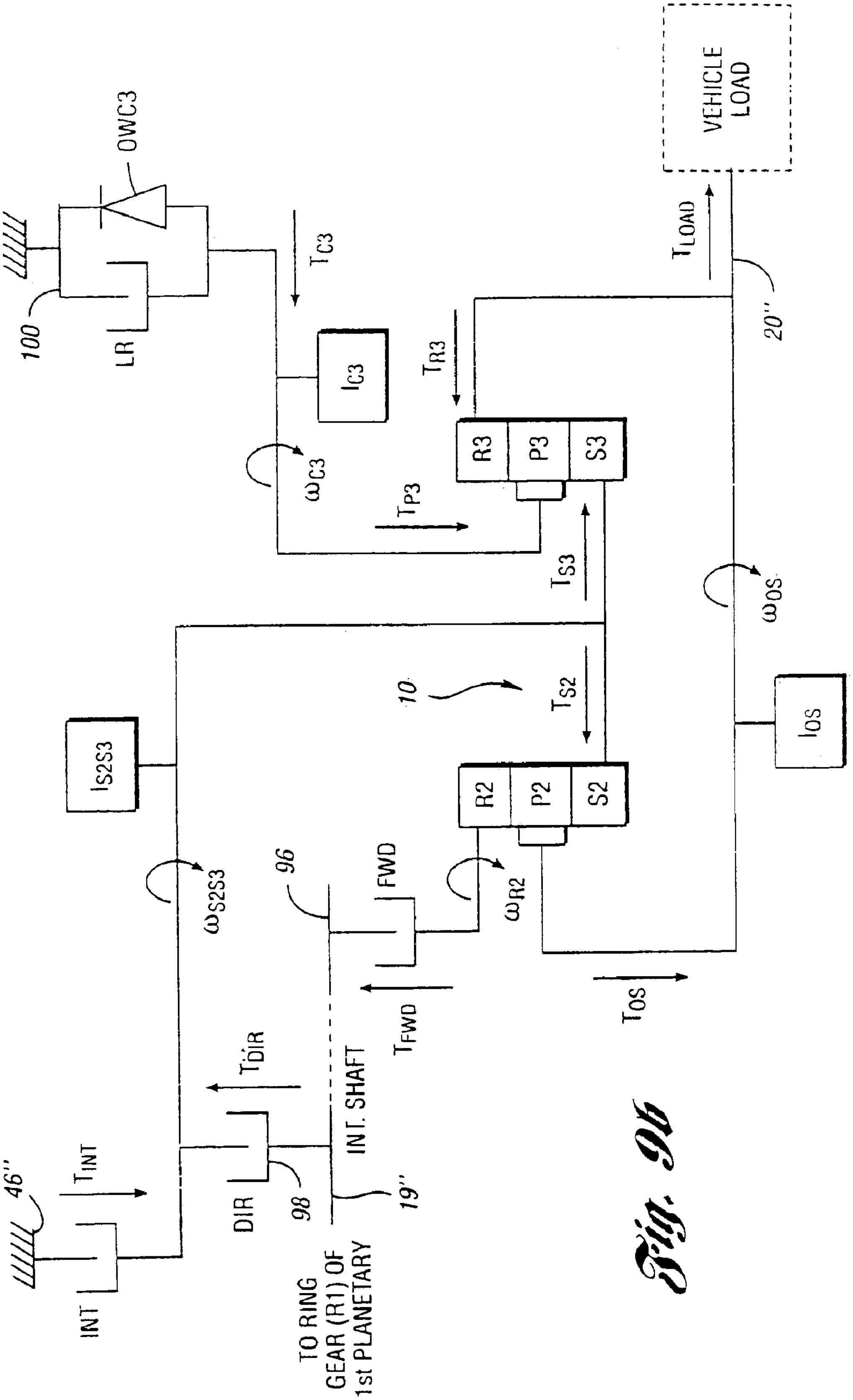
FIG. 9*b* is a diagram of the Simpson gearset elements indicating the terms used in swap-shift starting torque calculations for the friction elements of the overdrive and Simpson gearsets that are affected by rotary inertia torque.

FIG. 9*c* is a high-level schematic diagram of the overall powertrain, including the overdrive gearset and the Simpson gearset, together with labels representing the torque for each of the elements and the direction of torque delivery.

The state equations for both the overdrive gearset and the Simpson gearset are as follows:

$$I_{INP}\dot{\omega}_{INP}=T_{INP}-T_{P1} \quad (1)$$

$$I_{INT}\dot{\omega}_{INT}=T_{R1}-T_{DIR}+T_{FWD} \quad (2)$$

$$I_{S1}\dot{\omega}_{S1}=-T_{S1}-T_{C1}-T_{OD} \quad (3)$$

$$I_{S2S3}\dot{\omega}_{S2S3}=T_{INT}-T_{S2}+T_{DIR}-T_{S3} \quad (4)$$

$$I_{C3}\dot{\omega}_{C3}=T_{C3}-T_{P3} \quad (5)$$

$$I_{OS}\dot{\omega}_{OS}=T_{OS}-T_{R3}-T_{LOAD} \quad (6)$$

The planetary gear elements have the following relationships:

$$S_T\omega_S+R_T\omega_R=(S_T+R_T)\omega_C,$$

where $S_T$=number of teeth on the sun gear, $R_T$=number of teeth on the ring gear, and $\omega_S$, $\omega_R$ and $\omega_C$ are the angular velocities of the sun gear, ring gear and carrier, respectively, and $$\frac{T_R}{R}=\frac{T_S}{S},\ T_C+T_R+T_S=0.$$

where:

$T_R$=torque of the ring gear, $T_S$–torque of the sun gear and $T_C$=torque of the carrier.

The torque values for the elements of the overdrive planetary gearset are represented by the following equations:

$$-T_{R1}=T_{S1}\beta_1,\ \beta_1=\frac{R_1}{S_1} \quad (7)$$

$$T_{P1}-T_{R1}+T_{S1}+T_{C1}=0 \quad (8)$$

$$\beta_1\omega_{INT}+\omega_{S1}=(I+\beta_1)\omega_{INP} \quad (9)$$

The torque values for the first planetary gear unit of the Simpson gearset are represented by the following equations:

$$-T_{FWD}=T_{S2}\beta_2,\ \beta_2=\frac{R_2}{S_2} \quad (10)$$

$$-T_{FWD}+T_{S2}-T_{OS}=0 \quad (11)$$

$$\beta_2\omega_{R2}+\omega_{S2S3}=(I+\beta_2)\omega_{OS} \quad (12)$$

$$(\omega_{R2}=\omega_{INT})$$

The torque values for the elements of the third planetary gear unit, which is the second gear unit of the Simpson gearset, are set forth in the following equations:

$$T_{R3}=T_{S3}\beta_3,\ \beta_3=\frac{R_3}{S_3} \quad (13)$$

$$T_{P3}+T_{R3}+T_{S3}=0 \quad (14)$$

$$\beta_3\omega_{OS}+\omega_{S2S3}=(I+\beta_3)\omega_{C3} \quad (15)$$

The governing equations in simplified form for the transmission are set forth as follows, while ignoring the inertia terms $I_{C3}$, $I_{S1}$, and $I_{S2S3}$:

$$I_{INP}\omega_{INP}{}^{*}=T_{INP}-(I\beta_1)T_{OD}-\beta_1T_{C1} \quad (16)$$

$$I_{INT}\omega_{INT}^{*}=\beta_1T_{OD}+\beta_1T_{C1}-(1+\beta_2)T_{DIR}-\beta_2T_{INT}-\frac{\beta_2}{1+\beta_3}T_{C3} \quad (17)$$

$$I_{OS}\omega_{OS}^{*}=(1+\beta_2)T_{DIR}+(1+\beta_2)T_{INT}+\left(\frac{1+\beta_2\beta_3}{1+\beta_3}\right)T_{C3}-T_{LOAD}. \quad (18)$$

During the ratio change portion of a 2-3/3-2 swap-shift, the state equations for the input and intermediate shaft speeds can be simplified to:

$$I_{INP}\omega_{INP}{}^{*}=T_{INP}-(I+\beta_1)T_{OD} \quad (19)$$

$$I_{INT}\omega_{INT}{}^{*}=\beta_1T_{OD}-\beta_2T_{INT} \quad (20)$$

(Note: Since overrunning clutch OWC1 and the overrunning OWC3 will overrun, $T_{C1}$ and $T_{C3}$=0).

These equations, 19 and 20, are used to compute the torque (and hence starting pressure) needed to start the ratio change for each gearset during the 2-3/3-2 swap-shift by solving for the overdrive and intermediate clutch torques, as follows:

$$T_{OD} = \frac{T_{INP}}{1+\beta_1} - \frac{I_{INP}\omega_{INP}}{(1+\beta_1)}(\text{OD set}) \quad (21)$$

$$T_{INT} = \frac{\beta_1}{(1+\beta_1)}\left(\frac{T_{INP}}{\beta_2}\right) - \frac{\beta_1}{(1+\beta_1)}\frac{I_{INP}\omega_{INP}}{\beta_2} - \frac{I_{INT}\omega_{INT}}{\beta_2}(\text{Simpson set})$$

(Note: The torques needed include the effects of the intermediate and input (turbine) shaft accelerations).

In order to obtain a desired input speed (turbine speed), the overdrive set controller 212 changes pressure command, and hence overdrive clutch capacity by some amount $\Delta T_{OD}$ to speed up or slow down the input shaft speed. This is expressed as:

$$I_{INP}\omega_{INP}{}^{*}=T_{INP}-(I+\beta_1)(T_{OD}+\Delta T_{OD}) \quad (22)$$

Due to the kinematic coupling of the two gearsets, changes in the overdrive clutch torque are seen as torque disturbances at the Simpson gearset. This dynamic interaction affects the control of the intermediate shaft speed. This is expressed as:

$$I_{INT}\omega_{INT}{}^{*}=\beta_1(T_{OD}+\Delta T_{OD})-\beta_2 T_{INT} \quad (23)$$

In order to compensate for this torque disturbance, when controlling intermediate shaft speed, the new intermediate shaft torque capacity command then can be represented by the symbol $T'_{INT}$, which is equal to:

$$T'_{INT} = T_{INT}(\text{old command})\frac{+\beta_1}{\beta_2}\Delta T_{OD}. \quad (24)$$

Using the new intermediate shaft torque capacity command, the overdrive torque disturbance is compensated for while controlling input shaft speed. Substituting $T_{INT}$ (Equation 24) for $T_{INT}$ in Equation 23, gives:

$$I_{INT}\omega^{*}_{INT} = \beta_1(T_{OD}-\Delta T_{OD}) - \beta_2\left(T_{INT} - \frac{\beta_1}{\beta_2}\Delta T_{OD}\right) \quad (25)$$

Since, $$T_{INT} + \frac{\beta_1}{\beta_2}\Delta T_{OD} = T'_{INT},$$

Equation (25) can be written as follows:

$$I_{INT}\omega_{INT}{}^{*}=\beta_1 T_{OD}-\beta_2 T'_{INT} \quad (26)$$

In the preceding equation (25), the ratio $\beta_1$ to $\beta_2$ represents the swap-shift crosslink gain 244 between the overdrive gearset and the Simpson gearset during a 2-3 upshift or 3-2 downshift.

The foregoing analysis is for a 2-3 power-on upshift. Inertia torques for certain elements have been deleted for purposes of this simplified explanation. They can be accounted for, however, using the same analytical technique.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A multiple-ratio automatic transmission for an automotive vehicle comprising:

two gearsets for providing multiple torque flow paths between an engine and vehicle traction wheels, each gearset being characterized by at least two ratios that define multiple overall transmission ratios;

each gearset including a pressure-actuated friction element for establishing an upshift and a downshift between the two ratios;

a first controller for controlling pressure at the pressure-actuated friction element of one gearset; and a second controller for controlling pressure at the pressure-actuated friction element of the other gearset;

one gearset being upshifted as the other gearset is simultaneously downshifted, thereby effecting a swap-shift in an overall transmission ratio;

the first and second controller having dynamic interaction compensation whereby a pressure change in one of the friction elements will command a pressure change in the other friction element during a time progression of the swap-shift, which results in improved quality of the swap-shift in the overall transmission ratio.

2. The automatic transmission set forth in claim 1 wherein the one gearset is downshifted and the other gearset is upshifted as the overall transmission ratio is upshifted.

3. The automatic transmission set forth in claim 1 wherein the one gearset is upshifted and the other gearset is downshifted as the overall transmission ratio is downshifted.

4. The automatic transmission set forth in claim 1 wherein the controllers are speed-based, the transmission comprising a torque input element for the first gearset and a first speed sensor for monitoring the speed of the torque input element;

an intermediate shaft connecting a torque output element of the one gearset to a torque input element of the other gearset; and a second speed sensor for monitoring the speed of the intermediate shaft;

the transmission further comprising an output shaft drivably connected to the vehicle traction wheels and a third speed sensor for monitoring the speed of the output shaft;

the controllers responding to speed information from the speed sensors to implement synchronization of an upshift and a downshift of the one gearset and the other gearset during a swap-shift to achieve an overall transmission ratio change.

5. The automatic transmission set forth in claim 1 wherein the simultaneous upshifting and downshifting of each gearset during a swap-shift occurs as the controllers control pressure at each friction element in a closed-loop fashion during progression of the swap-shift when engine power is being delivered to the traction wheels.

6. The automatic transmission set forth in claim 1 wherein the simultaneous upshifting and downshifting of each gearset during a swap-shift occurs as the controllers control pressure at each friction element in an open-loop fashion during progression of the swap-shift when engine power delivery to the traction wheels is interrupted.

7. The automatic transmission set forth in claim 5 wherein the one gearset is downshifted and the other gearset is upshifted as the overall transmission ratio is upshifted.

8. The automatic transmission set forth in claim 5 wherein the one gearset is upshifted and the other gearset is downshifted as the overall transmission ratio is downshifted.

9. The automatic transmission set forth in claim 5 wherein the controllers are speed-based, the transmission comprising:

a torque input element for the first gearset and a first speed sensor for monitoring the speed of the torque input element;

an intermediate shaft connecting a torque output element of the one gearset to a torque input element of the other gearset; and a second speed sensor for monitoring the speed of the intermediate shaft;

the transmission further comprising an output shaft drivably connected to the vehicle traction wheels and a third speed sensor for monitoring the speed of the output shaft;

the controllers responding to speed information from the speed sensors to implement synchronization of an upshift and a downshift of the one gearset and the other gearset during a swap-shift for the overall transmission ratio.

10. The automatic transmission set forth in claim 6 wherein the one gearset is downshifted and the other gearset is upshifted as the overall transmission ratio is upshifted.

11. The automatic transmission set forth in claim 6 wherein the one gearset is upshifted and the other gearset is downshifted as the overall transmission ratio is downshifted.

12. A control method for controlling a multiple-ratio automatic transmission for an automotive vehicle including two gearsets controlled by pressure-actuated friction elements for providing multiple torque flow paths between an engine and vehicle traction wheels, each gearset having a controller, the method comprising the steps of:

measuring the input speed of one gearset and the input and output speeds of the other gearset;

monitoring shift progression and shift progression rate of the other gearset and the shift progression of the one gearset during a swap-shift;

transferring to the controller for the one gearset the shift progression and shift progression rate of the other gearset;

computing the desired input speed for the one gearset using the shift progression and shift progression rate from the other gearset during a swap-shift;

measuring actual input speed for the one gearset and controlling input speed error between the desired input speed and the actual input speed in a closed-loop fashion;

computing friction element command pressure for the one gearset;

converting pressure data from the controller for the one gearset to torque data for the one gearset using friction element gain data for the one gearset;

converting torque data from the one gearset to torque data for the other gearset;

converting torque data from the other gearset to an interactive pressure value for the other gearset using friction element gain data for the other gearset;

controlling friction element pressure for the friction element of the other gearset in a closed-loop fashion during a swap-shift using input and output speed information for the other gearset; and transferring information regarding the interactive pressure value to the one gearset for modifying the friction element pressure for the friction element of the one gearset, whereby compensation for dynamic interaction is effected for the gearsets during swap-shifts.

13. A control method for controlling a multiple-ratio automatic transmission for an automotive vehicle including two gearsets controlled by pressure-actuated friction elements for providing multiple torque flow paths between an engine and vehicle traction wheels, each gearset having a controller, the method comprising the steps of:

measuring the input speed of the one gearset and the input and output speeds of the other gearset;

monitoring shift progression and shift progression rate of the other gearset and the shift progression of the one gearset during a swap-shift;

transferring to the controller for one gearset the shift progression and shift progression rate of the other gearset;

computing the desired input speed for the one gearset using the shift progression and shift progression rate from the other gearset during a swap-shift;

measuring actual input speed and controlling input speed error between the desired input speed and the actual input speed in a closed-loop fashion;

computing friction element command pressure for the one gearset;

computing friction element command pressure for the other gearset;

converting pressure data from the controller for the one gearset to torque data for the one gearset using friction element gain data for the one gearset;

converting torque data from the one gearset to torque data for the other gearset;

converting torque data from the other gearset to a first interactive pressure value for the other gearset using friction element gain data for the other gearset;

converting pressure data from the controller for the other gearset to torque data for the other gearset using friction element gain data for the other gearset;

converting torque data from the other gearset to torque data for the one gearset;

converting torque data from the one gearset to a second interactive pressure value for the one gearset using friction element gain data for the one gearset;

controlling friction element pressure for the friction element of the other gearset in a closed-loop fashion during a swap-shift using input and output speed information for the other gearset;

controlling friction element pressure for the friction element of the one gearset in a closed-loop fashion during a swap-shift using input speed information and output shaft speed information for the one gearset;

transferring information regarding the second interactive pressure value to the other gearset for modifying the friction element pressure for the friction element pressure of the other gearset; and transferring information regarding the first interactive pressure value to the one gearset for modifying the friction element pressure for the friction element pressure of the one gearset;

the controllers for the one gearset and the other gearset compensating for dynamic interaction of the gearsets during an inertia phase of a swap-shift.

14. The method set forth in claim 12 including the step of providing independent starting and ending control of the ratio change for each gearset, whereby the start of a ratio change for the one gearset occurs after the start of a ratio change for the other gearset during a swap-shift.

15. The method set forth in claim 12 including the step of providing independent starting and ending control of a ratio change for each gearset, whereby the start of a ratio change for the one gearset occurs substantially simultaneously with respect to the start of a ratio change for the other gearset during a swap-shift.

16. The method set forth in claim 13 including the step of providing independent starting and ending control of the ratio change for each gearset, whereby the start of a ratio change for the one gearset occurs after the start of a ratio change for the other gearset during a swap-shift.

17. The method set forth in claim 13 including the step of providing independent starting and ending control of a ratio change for each gearset, whereby the start of a ratio change for the one gearset occurs substantially simultaneously with respect to the start of a ratio change for the other gearset during a swap-shift.

18. The method set forth in claim 12 including the step of starting and ending control of the ratio change for each gearset whereby the end of a ratio change for the one gearset occurs before the end of a ratio change for the other gearset during a swap-shift.

19. The method set forth in claim 12 including the step of starting and ending control of the ratio change for each gearset whereby the end of a ratio change for the one gearset occurs substantially simultaneously with respect to the end of a ratio change for the other gearset during a swap-shift.

20. The method set forth in claim 13 including the step of providing independent starting and ending control of a ratio change for each gearset whereby a ratio change for the one gearset ends before the end of the ratio change for the other gearset during swap-shift.

21. The method set forth in claim 13 including the step of providing independent starting and ending control of a ratio change for each gearset whereby a ratio change for the one gearset ends substantially simultaneously with the end of the ratio change for the other gearset.

22. The method set forth in claim 13 including the step of controlling actuating pressure for the friction element of the other gearset in a closed-loop fashion, the closed-loop control being initiated independently of the controller for the one gearset, whereby premature closed-loop control of the friction element of the one gearset is avoided.

23. The method set forth in claim 13 including the step of controlling independently the length of time a swap-shift is in a closed-loop control for the friction elements of each gearset.

24. The method set forth in claim 13 including the step of computing acceleration of elements of each gearset and using the acceleration information to compute internal inertia torques of the gearset elements; and calculating starting torques for both the one and the other gearsets using the internal inertia torque information, the controllers for the one gearset and the other gearset compensating for gearset element accelerations that occur during a swap-shift as starting torques are calculated, thereby independently initiating a start of a ratio change in each gearset.

25. The method set forth in claim 12 including the step of interrupting closed-loop control of the shift progression for the gearsets when engine power is off and the traction wheels are moving and initiating open-loop control of the friction elements of each gearset during a swap-shift.

26. The method set forth in claim 13 including the step of interrupting closed-loop control of the shift progression for the gearsets when engine power is off and the traction wheels are moving and initiating open-loop control of the friction elements of each gearset during a swap-shift.

27. A multiple-ratio automatic transmission for an automotive vehicle having an engine, a torque converter with an impeller connected to the engine and a turbine, the transmission comprising:

a first planetary gearset with at least two ratios having a pressure-actuated brake element for effecting one gear ratio for the first planetary gearset and a pressure-actuated clutch element for effecting another gear ratio for the first planetary gearset;

a second planetary gearset having at least three ratios having a first pressure-actuated element for effecting one gear ratio for the second planetary gearset, a second pressure-actuated element for effecting a second gear ratio for the second planetary gearset and a third pressure-actuated element for effecting a third gear ratio for the second planetary gearset;

the first and second planetary gearsets providing multiple torque flow paths between the engine and vehicle traction wheels;

a torque input shaft for the second planetary gearset being connected to a torque output shaft of the first planetary gearset;

a torque output shaft for the second planetary gearset being drivably connected to the traction wheels;

a first speed-based controller for controlling pressure at the pressure-actuated friction elements of the first planetary gearset;

a second speed-based controller for controlling pressure at the pressure-actuated friction elements of the second planetary gearset;

a first speed sensor for monitoring the speed of the turbine;

a second speed sensor for monitoring the speed of the torque output shaft of the first planetary gearset; and a third speed sensor for monitoring the speed of the torque output shaft of the second planetary gearset;

one planetary gearset being upshifted as the other planetary gearset is being downshifted, thereby effecting a swap-shift for the overall transmission ratio;

the first and second controllers having dynamic torque-based interaction based upon monitored speed sensor information, whereby a pressure change at one of the friction elements for one of the first and second planetary gearsets will command a pressure change at one of the friction elements for the other of the first and second planetary gearsets during a time progression of the swap-shift, which results in improved quality of the swap-shift in the overall transmission ratio.

28. The transmission set forth in claim 27 wherein the first gearset is downshifted and the second gearset is upshifted as the overall transmission ratio is upshifted during a swap-shift event.

29. The transmission set forth in claim 27 wherein the first gearset is upshifted and the second gearset is downshifted as the overall transmission ratio is downshifted during a swap-shift event.

30. The transmission set forth in claim 27 wherein the first and second controllers each include central processors with stored control algorithms for effecting pressure control of the pressure-actuated friction elements involved in a swap-shift, whereby the second controller, during upshifts and downshifts of the second gearset, responds to transient torque changes in the power flow path established by the first planetary gearset.

31. The transmission set forth in claim 27 wherein the first and second controllers each include a central processor with stored algorithms for effecting a pressure control of pressure-actuated friction elements involved in a swap-shift, whereby the first controller, during upshifts and downshifts of the first gearset, responds to shift progression and shift progression rate information for the second gearset to delay a start of ratio change control for the first gearset until after a calibrated ratio change progression of the second gearset is reached, thereby improving swap-shift quality by reducing transient inertia torque disturbances.

32. The transmission set forth in claim 30 wherein the first gearset is downshifted and the second gearset is upshifted as the overall transmission ratio is upshifted during a swap-shift event.

33. The transmission set forth in claim 31 wherein the first gearset is upshifted and the second gearset is downshifted as the overall transmission ratio is downshifted during a swap-shift event.

34. The transmission set forth in claim 27 wherein the first and second controllers effect open-loop control of the pressure-actuated friction elements involved in a swap-shift when engine power is off.

35. The transmission set forth in claim 34 wherein the first gearset is downshifted and the second gearset is upshifted as the overall transmission ratio is upshifted during a swap-shift event.

36. The transmission set forth in claim 34 wherein the first gearset is upshifted and the second gearset is downshifted as the overall transmission ratio is downshifted during a swap-shift event.

37. An automatic transmission for an automotive vehicle comprising:

a simple planetary gearset and a compound planetary gearset arranged in series to establish multiple torque flow paths between an engine and vehicle traction wheels;

a first pressure-actuated reaction brake for anchoring a sun gear of the simple planetary gearset to establish an upshift of the simple planetary gearset on an overall transmission ratio downshift;

a second pressure-actuated reaction brake for anchoring a sun gear of the compound planetary gearset to establish an upshift of the compound planetary gearset on the overall transmission ratio downshift;

a ring gear of the simple planetary gearset being drivably connected to a torque input element of the compound planetary gearset;

a first controller for controlling pressure at the pressure-actuated reaction brake for the simple planetary gearset; and a second controller for controlling pressure at the pressure-actuated reaction brake for the compound planetary gearset;

the first and second controllers having dynamic interaction whereby a pressure change at one of the pressure-actuated reaction brakes will command a pressure change at the other pressure-actuated reaction brake during a swap-shift, which results in improved quality of the swap-shift in the overall transmission ratio.

38. The automatic transmission set forth in claim 37 wherein the first controller controls pressure at the first pressure-actuated reaction brake to establish a downshift of the simple planetary gearset in an overall transmission ratio upshift;

the second controller controlling pressure at the second pressure-actuated reaction brake to establish a downshift of the compound planetary gearset in the overall transmission ratio downshift;

the first and second controllers having dynamic interaction whereby a pressure change at one of the pressure-actuated reaction brakes will command a pressure change at the other pressure-actuated reaction brake during a swap-downshift, which results in improved quality of the swap-shift in the overall transmission ratio.

39. An automatic transmission for an automotive vehicle comprising a simple planetary gearset and a compound planetary gearset arranged in series to establish multiple torque flow paths between an engine and vehicle traction wheels;

a pressure-actuated reaction brake for anchoring a sun gear of the simple planetary gearset to establish an upshift of the simple planetary gearset in an overall transmission ratio downshift;

a pressure-actuated clutch for drivably connecting two elements of the compound planetary gearset to establish a downshift of the compound planetary gearset on the overall transmission ratio downshift;

a ring gear of the simple planetary gearset being drivably connected to a torque input element of the compound planetary gearset;

a first controller for controlling pressure at the pressure-actuated reaction brake for the simple planetary gearset; and a second controller for controlling pressure at the pressure-actuated clutch for the compound planetary gearset;

the first and second controllers having dynamic interaction whereby a pressure change at the pressure-actuated reaction brake will command a pressure change at the pressure-actuated clutch during a swap-upshift which results in an improved quality of the swap-shift in the overall transmission ratio.

40. The automatic transmission set forth in claim 39 wherein the first controller controls pressure at the pressure-actuated reaction brake to establish a downshift of the simple planetary gearset in an overall transmission ratio upshift;

the second controller controlling pressure at the pressure-actuated clutch for the compound planetary gearset;

the first and second controllers having dynamic interaction whereby a pressure change at the pressure-actuated reaction brake will command a pressure change at the pressure-actuated clutch during a swap-downshift which results in improved quality of the swap-shift in the overall transmission ratio.

* * * * *